US012656770B2

(12) United States Patent
Wang et al.

(10) Patent No.: US 12,656,770 B2
(45) Date of Patent: Jun. 16, 2026

(54) SYSTEM AND METHOD FOR MOTOR ECCENTRICITY BASED CONTROL USING TOPOLOGICAL DATA ANALYSIS

(71) Applicants: Bingnan Wang, Belmont, MA (US); Chungwei Lin, Arlington, MA (US)

(72) Inventors: Bingnan Wang, Belmont, MA (US); Chungwei Lin, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 616 days.

(21) Appl. No.: 18/154,253

(22) Filed: Jan. 13, 2023

(65) Prior Publication Data

US 2024/0126251 A1 Apr. 18, 2024

Related U.S. Application Data

(60) Provisional application No. 63/379,321, filed on Oct. 13, 2022.

(51) Int. Cl.
*G05B 23/02* (2006.01)

(52) U.S. Cl.
CPC ................................ *G05B 23/0267* (2013.01)

(58) Field of Classification Search
None
See application file for complete search history.

(56) References Cited

U.S. PATENT DOCUMENTS

| | | | | | |
|---|---|---|---|---|---|
| 5,579,232 | A | * | 11/1996 | Tong | G05B 19/4065 706/912 |
| 2008/0061649 | A1 | * | 3/2008 | Kim | H02K 1/14 310/156.32 |
| 2017/0047872 | A1 | * | 2/2017 | Spenninger | H02P 6/10 |
| 2018/0157933 | A1 | * | 6/2018 | Brauer | G06F 18/24143 |
| 2019/0236407 | A1 | | 8/2019 | Todoriki et al. | |
| 2020/0348207 | A1 | * | 11/2020 | Wang | H02H 3/50 |

(Continued)

OTHER PUBLICATIONS

Narayan et al. 'Detection of Stator Fault in Synchronous Reluctance Machines Using Shallow Neural Networks' In 2021 IEEE Energy Conversion Congress and Exposition (ECCE) (pp. 1347-1352). IEEE, published 2021.*

(Continued)

*Primary Examiner* — Bernard G Lindsay
(74) *Attorney, Agent, or Firm* — Gene Vinokur

(57) ABSTRACT

A system and method for motor eccentricity fault detection is disclosed. The method includes extraction of fault-related features through topological data analysis (TDA) for motor current signals and apply them to motor eccentricity fault detection. The method further includes the procedure of obtaining topological features from time-domain data and representing them in persistence diagrams and vectorized Betti sequences. The method further includes the extraction of fault-related features from the obtained topological features of the data, which can be distinctively associated with not only fault type but also fault severity level. Further, the method includes use of machine learning models to extract fault-related features from TDA, for the prediction of motor eccentricity fault level, even for data from new eccentricity levels that are not seen in the training data.

20 Claims, 25 Drawing Sheets

(56) References Cited

U.S. PATENT DOCUMENTS

| | | | |
|---|---|---|---|
| 2021/0281207 A1* | 9/2021 | Mueller | H02P 27/08 |
| 2021/0397177 A1* | 12/2021 | Nataraj | G05B 23/0256 |
| 2024/0028939 A1* | 1/2024 | Akhalwaya | G06N 3/08 |

OTHER PUBLICATIONS

Zhou et al. 'Learning persistent homology of 3D point clouds' Computers & Graphics 102 (2022) 269-279, published Nov. 3, 2021.*

Narayan Siwam et al. "Detection of Stator Fault in Synchronous Reluctance Machines using Shallow Neural Networks," 2021 IEEE Energy Conversion Congress and Exposition, IEEE, Oct. 10, 2021. pp 1347-1352.

* cited by examiner (Healthy operational motor)

(Static Eccentricity)

(Dynamic Eccentricity)

(Mixed Eccentricity)

SYSTEM AND METHOD FOR MOTOR ECCENTRICITY BASED CONTROL USING TOPOLOGICAL DATA ANALYSIS

TECHNICAL FIELD

The present disclosure relates generally to motors, and more specifically to a system and a method for detecting an operation fault in a motor.

BACKGROUND

Electric motors are widely used in many aspects of the modern society, such as factories, household appliances, electric vehicles, etc. With the increased usage, monitoring the operating conditions of the motor and detecting faults in the motor are gaining importance especially with the growth of internet of things. There are different faults that can happen in a motor, one most common fault is eccentricity fault that occurs when an air gap between a stator bore, and a rotor is not uniform.

Eccentricity faults can be categorized into three types, namely static eccentricity, dynamic eccentricity, and mixed eccentricity. Static eccentricity occurs when the center of the rotor is displaced from the stator bore central axis, while the rotation center is still aligned with the center of the rotor. Dynamic eccentricity occurs when the rotation center and the stator bore central axis still align, but the rotor center is displaced. Mixed eccentricity is a combination of both static eccentricity and dynamic eccentricity.

There are many reasons that can cause motor eccentricity. The air gap eccentricity damages other parts of the motor and causes breakdown of the machine using the motor if not corrected in time. During the manufacturing stage, it is not feasible to produce motors with zero air gap eccentricity. Static eccentricity may exist due to the imperfect alignment between stator core assembly and the rotation center, or the deviation of the stator core from a perfect circle. Similarly, a small dynamic eccentricity can also exist due to the imperfect alignment between center of the rotor and the rotation axis, or imperfect shape of the rotor. Through the operating lifetime of a motor, the eccentricity level can increase, for example, due to bearing degradation, or the mechanical degradation of the mount, causing physical shift of the stator assembly. The air gap eccentricity induces unbalanced magnetic pull (UMP), which works against rotor stiffness and may cause stator winding faults and rubbing between rotor and stator with increased eccentricity, eventually leading to machine failure. It is therefore important to check electric motors for eccentricity both in the production stage for quality control, and throughout operation for the safety and asset protection.

Vibration analysis and motor current signature analysis (MCSA) are most widely used methods for detecting eccentricity faults. The UMP caused by air gap eccentricity results in increased vibration. The increased vibrations can be monitored by accelerometers installed on motor casing. Recently, machine learning and deep learning techniques have been applied to the fault detection and classification of electric machines based on measured vibration signals. However, vibration signals can often be influenced by noises from other sources, such as the mechanical unbalance of the motor, the excitation from external sources in complicated factory setting, and the likes. In addition, the sensitivity of vibration analysis also varies depending on the location of the sensor on the motor casing. It is therefore challenging to identify eccentricity faults based solely on vibration signals.

MCSA has been proposed to address these problems. MCSA needs no additional dedicated sensor and therefore has the added advantage of simple implementation thereby saving cost. MCSA uses stator current harmonics to detect eccentricity. In effect, the non-uniform air gap due to eccentricity causes additional harmonics in the air gap permeance function and air gap flux. Some of these harmonics will be reflected in induced voltage in stator windings and eventually in the stator current. One challenge for eccentricity fault detection using MCSA is that a lot of the spatial harmonics caused by eccentricity can be reflected in vibration signals, but do not appear in the time harmonics and are absent in the stator current. In addition, certain stator current fault signatures can depend on specific motor design parameters and are not universal for all motors. For instance, it has been shown that under certain combinations of stator slot and rotor bar numbers, some fault signatures due to static eccentricity are more difficult to detect.

Another approach for the analysis of eccentricity faults is by using either time-stepping finite-element simulations or modified winding function method (MWFM) based circuit models. The above methods are mostly used for physics based modelling approach. Finite-element simulations offer higher accuracy in identifying fault frequencies and their corresponding amplitudes but are also more time-consuming and require detailed geometrical parameters and material properties of the motor. MWFM based circuit model is much faster, but not as accurate in identifying the fault component amplitude due to the simplifications in the modeling process, and still requires certain motor design information beyond nameplate, such as nominal air gap size, slot number and rotor bar number for induction machines or synchronous machines.

It is also challenging to apply data-driven methods for MCSA based motor fault detection with only stator current signals. Unlike vibration signals, the current components due to eccentricity faults are typically a few orders smaller than the dominating fundamental component at supply frequency. Commonly used machine learning techniques on time-domain signals that have been working well for vibration signals cannot effectively distinguish stator current signals of machines under healthy and faulty conditions. Therefore, a feature extraction process based on physical model built on expert domain knowledge and detailed spectrum analysis of measured stator current signals is typically required to extract frequency components due to faults before the signals can be applied to the machine learning models for data-driven approaches. In addition, a relatively long time-domain signal, typically between a few seconds to tens of seconds, is required to extract the extremely sensitive fault components from conventional spectrum analysis.

It is therefore desirable to have an effective approach to identify and extract fault-related features without involving physical models and signal processing process, and ideally from a shorter segment of signal, for motor fault detection.

SUMMARY

Some embodiments are based on realization that an effective solution for motor eccentricity fault detection is required, which is computationally efficient and accurate than previous solutions discussed above.

Accordingly, a method for motor eccentricity fault detection is disclosed. The method includes an extraction of fault-related features of a motor, for example, an induction motor or a synchronous motor, through topological data analysis (TDA) for motor current signals and apply them to motor eccentricity fault detection. TDA is a mathematical process for extracting shape information from a data space. TDA can be applied to time-series data, image data, sensor data, and the likes for extracting intrinsic geometric properties of objects. The method for motor eccentricity fault detection based on TDA disclosed herein includes the procedure of obtaining topological features from time-domain data and representing them in persistence diagrams and vectorized Betti sequences. The method further includes the extraction of fault-related features from the obtained topological features of the time-domain data, which can be distinctively associated with not only fault type but also fault severity level. Further, the method includes machine learning models using the extracted fault-related features from TDA, for the prediction of motor eccentricity fault level, even for data from new eccentricity levels that are not seen in the training data.

Some embodiments are based on recognition that the TDA method is less sensitive to the choice of metrics compared with other geometric methods, is coordinate-free, and only extracts intrinsic geometric properties of objects, which makes it more robust to noises.

To that end, some embodiments are based on realization that TDA along with application of principles of persistent homology, provides data analysis methods which are very effective in fault analysis problems in domains such as image analysis, time-series data analysis, sensor networks, chemistry, and material science, etc.

Some previous method are based applications of TDA utilizing persistent homology method to reveal major shapes in data spaces, and either ignore smaller features or consider them as noises. However, the various embodiments disclosed herein provide filtering out the main shape and focusing on the small features of the data space, such as the time-series stator current data, in the persistent homology.

To that end, some embodiments are based on the recognition that that the extracted topological features in the manner described above do contain the fault signatures: they are distinct between data from the same motor with different static eccentricity level, making them suitable for the development of data-driven machine learning models for predicting the eccentricity fault of the motor.

Various embodiments provide methods and systems for identification and extraction of fault-related features without involved physical models and signal processing process, and only use a small segment of measurement signal to achieve that.

The methods and systems disclosed herein can be used in at least two application scenarios for motor eccentricity fault detection: one in the manufacturing stage, the other through the operation of the motor.

In the manufacturing stage, the goal is to inspect the manufactured motors and identify the eccentricity level for quality control purpose. Since many motors of the same model will be mass produced, data covering a wide range of eccentricity levels is collected with a test motor and based on this collected data, a model is developed to make predictions for new data measured on other motors of the same type.

During the operating lifetime of a motor, is it not possible to have the data for all possible eccentricity levels. However, measurement data collected during inspections is available when eccentricity level is still low. Thus, some embodiments are based on recognition that a model can be built based on these earlier measurements and used to predict the eccentricity level according to later measurements where the fault is expected to become more severe over time.

Accordingly, some embodiments disclose a fault detector for detecting an eccentricity of a motor including a stator and a rotor separated by an air gap. The fault detector comprises a processor, and a memory having instructions stored thereon that, when executed by the processor, cause the fault detector to collect, over a communication channel including one or a combination of a wired and wireless communication link, an electrical feedback signal of an operation of the motor including time series data of three-phase current measured during a period of the operation of a motor. The processor is further configured to map data points of the time series data into a three-dimensional space of the three-phase current to form a three-phase point cloud. The processor is further configured to extract a topological representation of topological features of the three-phase point cloud using topological data analysis (TDA). The processor is further configured to classify an eccentricity of the motor based on the extracted topological representation. Further, the processor is configured to transmit, over the communication channel, one or a combination of an indication of the classified eccentricity of the motor and a control command selected based on the classified eccentricity.

According to another embodiment, a method is disclosed for detecting an eccentricity fault in a motor including a stator and a rotor separated by an air gap. The method comprises collecting an electrical feedback signal of an operation of the motor including time series data of three-phase current measured during a period of the operation of the motor. The method further comprises mapping data points of the time series data into a three-dimensional space of the three-phase current to form a three-phase point cloud. The method further includes extracting a topological representation of topological features of the three-phase point cloud using topological data analysis (TDA). The method additionally includes classifying an eccentricity of the motor based on the extracted topological representation. Additionally, the method includes transmitting one or a combination of an indication of the classified eccentricity of the motor and a control command selected based on the classified eccentricity, over a communication channel.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figures 1A, 1B:
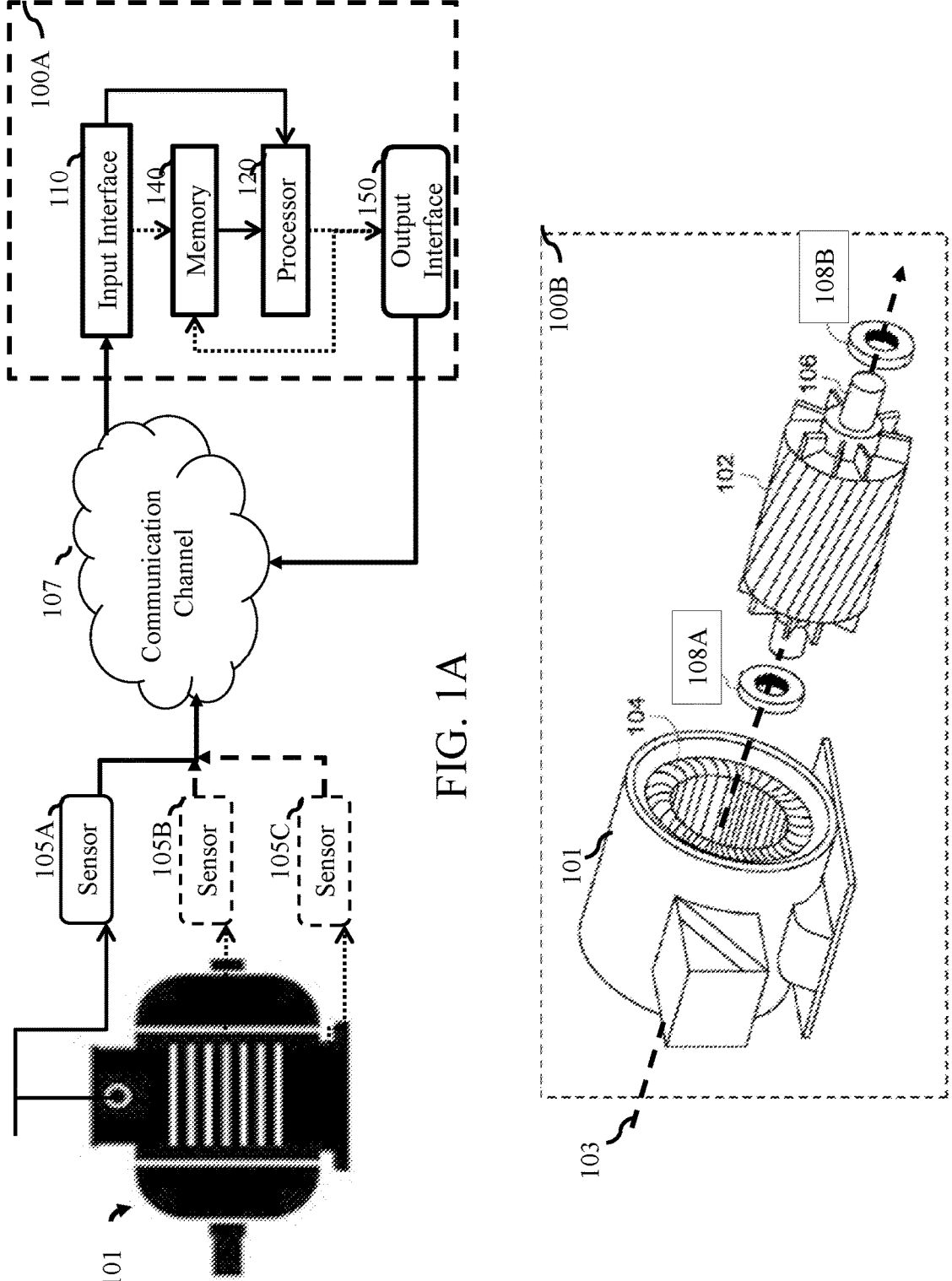
FIG. 1A shows a schematic diagram illustrating a fault detector system for a motor, according to some embodiments of the present disclosure.
FIG. 1B shows a schematic diagram of the motor, according to some embodiments of the present disclosure.

FIG. 1A shows a schematic diagram illustrating the fault detector system for the motor, for example, a motor 101, according to some embodiments of the present disclosure. In an example, the system for detecting the operation fault may include the motor 101, sensors 105A, 105B, 105C, fault detector 100A, and a communication channel 107. The motor 101 is an AC electric motor in which, at steady state, rotation of its shaft is synchronized with frequency of supply current. Examples of synchronized motors include reluctance and permanent magnet motors. The sensors 105A, 105B, 105C are connected to the motor 101. According to certain embodiments, the sensors 105A, 105B, 105C may be current and voltage sensors for obtaining current and voltage of each winding of the motor 101. Other sensors are contemplated including torque sensors, environmental sensors (temperature, humidity, etc.), and other types of sensors used to assist the operation, maintenance or management of the motor 101. In an example, the sensors 105A, 105B, 105C are connected via wirelessly or wire to the motor 101 to gather data from the motor 101.

The communication channel 107 may include a medium through which the data from the motor 101 may be communicated to the fault detector 100A. Examples of the communication channel 107 may include, but are not limited to, a dedicated short-range communication (DSRC) network, a mobile ad-hoc network (MANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the system for detecting the operation fault in the motor 101 may be operable to connect to the communication channel 107, in accordance with various wireless communication protocols. Examples of such wireless communication protocols may include, but are not limited to, IEEE 802.11, 802.11p, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), and/or Bluetooth (BT) communication protocols.

The fault detector 100A may detect a fault in an operation of the motor 101. The fault detector 100A may include an input interface 110, a memory 140, a processor 120, and an output interface 150. The input interface 110 of the fault detector 100A receives the sensor data from the sensors 105A, 105B, 105C. The memory 140 stores the sensor data. In an example, the memory 140 may store the sensor data permanently. In another example, the memory 140 may store the sensor data temporarily for a pre-defined time-period. The time-period may be determined based on user/operator goals/interests. The sensor data is then processed by a processor 120 and either outputted to an output interface 150, or can be stored in the memory 140, depending on the user/operator goals/interests. In an embodiment, the sensor data gathered from the sensors 105A, 105B, 105C is supplied to the fault detector 100A via the communication channel 107 which may include a wired or wireless communication link for communicating the sensor data. The sensor data gathered from the sensors 105A, 105B, 105C may include an electrical feedback signal of an operation of the motor 101. The electrical feedback signal includes time series data of three-phase current measured during a period of the operation of the motor 101. The fault detector 100A may map data points of the time series data into a three-dimensional space of the three-phase current to form a three-phase point cloud. The fault detector 100A may extract a topological representation of topological features of the three-phase point cloud using the TDA. The fault detector 100A may classify an eccentricity of the motor based on the extracted topological representation. In an example, the classified eccentricity includes a type of the eccentricity and a level of severity of the eccentricity. The fault detector 100A may transmit, over the communication channel 107, one or a combination of an indication of the classified eccentricity of the motor and a control command selected based on the classified eccentricity. In an embodiment, the processor 120 of the fault detector 100A may cause the output interface 150 to transmit, over the communication channel 107, one or a combination of an indication of the classified eccentricity of the motor and a control command selected based on the classified eccentricity. The fault detector 100A may select the control command based on the type of the eccentricity and the level of severity of the eccentricity. In an example, the output interface 150 may transmit, via the communication channel 107, the indication of the classified eccentricity and the control command to a user or a system operating the motor 101. The indication of the classified eccentricity and the control command may cause the user or the system to take corrective actions for removing the eccentricity in the motor 101. The operations performed by the fault detector 100A for detecting the fault in the operation of the motor 101A is explained in detail later with reference to FIG. 5.

FIG. 1B shows a schematic diagram 100B of the motor 101, according to an embodiment of the present disclosure. The motor 101 includes a rotor 102, a stator 104, a main shaft 106, and two bearings 108A and 108B. An eccentricity fault of the motor 101 is typically due to a manufacturing error or an operational error, which makes the air gap between the stator 104 and the rotor 102 non-uniform. In an example, when an axis of rotation 103 of the motor 101 does not coincide with an axis of symmetry. In an example, the eccentricity in the motor 101 may be one of a static eccentricity, a dynamic eccentricity, or a mixed eccentricity. The description of the type of eccentricity is explained in detail with reference to FIG. 2A, FIG. 2B, FIG. 2C, and FIG. 2D.

FIG. 2A, FIG. 2B, FIG. 2C, and FIG. 2D are schematics illustrating the different types of eccentricity faults, according to some embodiments of the present disclosure. Any electric AC motor, such as the motor 101 comprises the stator 104 and the rotor 102 separated by an air gap 124 in between. The eccentricity fault is a type of motor fault caused by formation of unequal air gap between the stator 104 and the rotor 102.

Figures 2A, 2B, 2C, 2D:
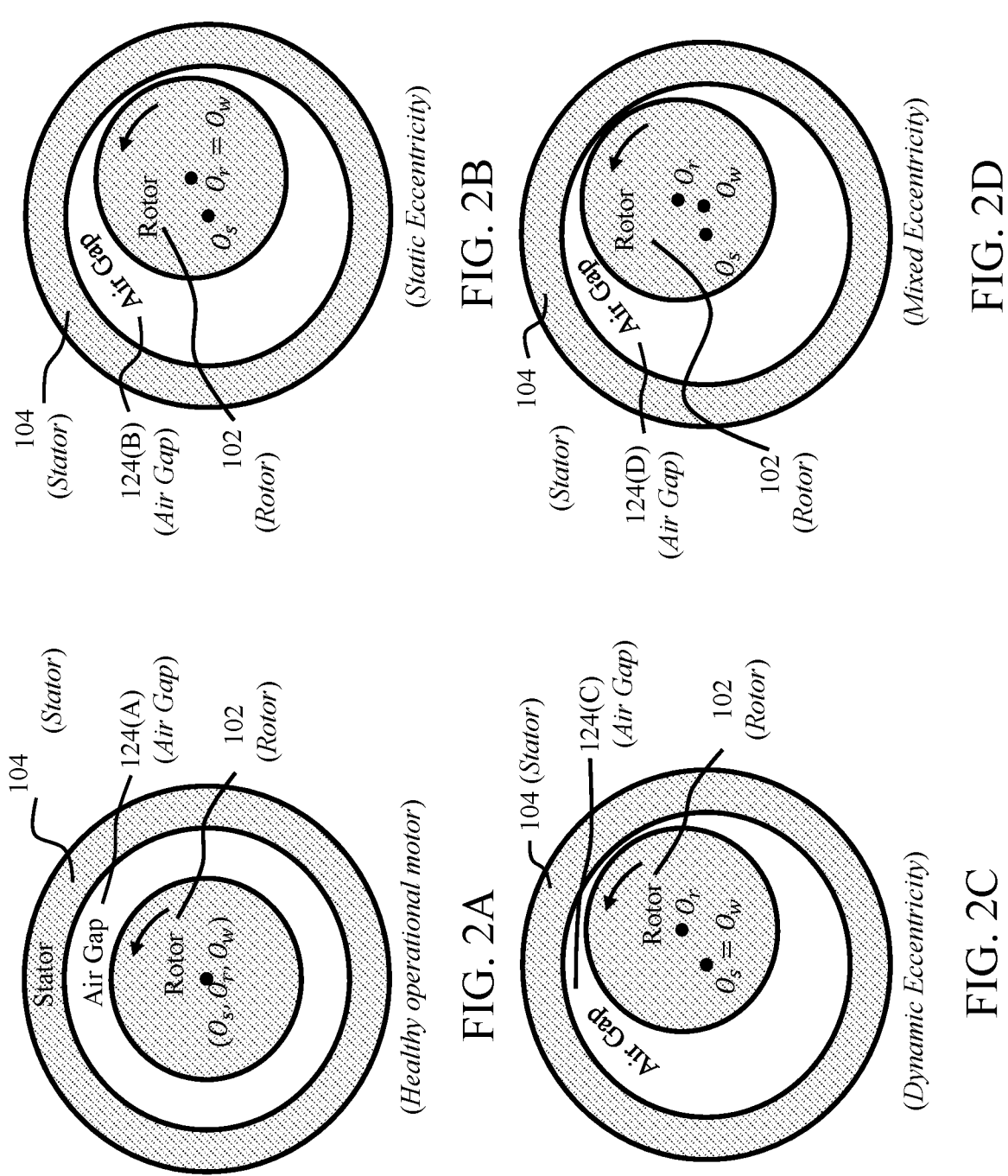
FIG. 2A shows a schematic illustrating the motor, according to some embodiments of the present disclosure.
FIG. 2B shows a schematic illustrating a static eccentricity fault, according to some embodiments of the present disclosure.
FIG. 2C shows a schematic illustrating a dynamic eccentricity fault, according to some embodiments of the present disclosure.
FIG. 2D shows a schematic illustrating a mixed eccentricity fault, according to some embodiments of the present disclosure.

FIG. 2A shows a schematic illustrating the motor 101, according to some embodiments of the present disclosure. The motor 101 illustrated in FIG. 2A is an example of a healthy motor which is free from any type of the eccentricity fault. A point Ow is a center of rotation, a point Os is a center of the stator 104, and a point Or is a center of the rotor 102. When the three points Ow, Os, and Or coincide, the motor 101 is healthy, meaning there is no eccentricity fault, and the air gap 124(A) between the stator 104 and the rotor 102 is uniform at different locations.

FIG. 2B shows a schematic illustrating the static eccentricity fault, according to some embodiments of the present disclosure. The points Or and Ow coincide but are having an offset from the center of the stator bore Os. Since the rotor 102 always rotates around the center point Ow, a static eccentricity fault is present, and the air gap 124(B) between the stator 104 and the rotor 102 is not uniform at different locations.

FIG. 2C shows a schematic illustrating the dynamic eccentricity fault, according to some embodiments of the present disclosure. The center of rotation Ow of the rotor 102 is aligned with the stator center Os, but the rotor center Or is orbiting around the point Ow. Since the rotor is not rotating around its own center of mass, the air gap 124(C) will vary depending on the rotation angle of the rotor and change dynamically.

FIG. 2D shows a schematic illustrating the mixed eccentricity fault, according to some embodiments of the present disclosure. A mixture of both the static eccentricity and the dynamic eccentricity is mixed eccentricity, where the points Or, Os, and Ow are not aligned with each other. In this case, both static eccentricity fault and dynamic eccentricity fault exist.

Typically, static eccentricity of motors is created during the manufacturing process. Detection of static eccentricity fault at an early stage is essential, as it can evolve into mixed eccentricity over the motor's operation due to the unbalanced magnetic pull, and finally leads to a breakdown of the machine.

Figure 3:
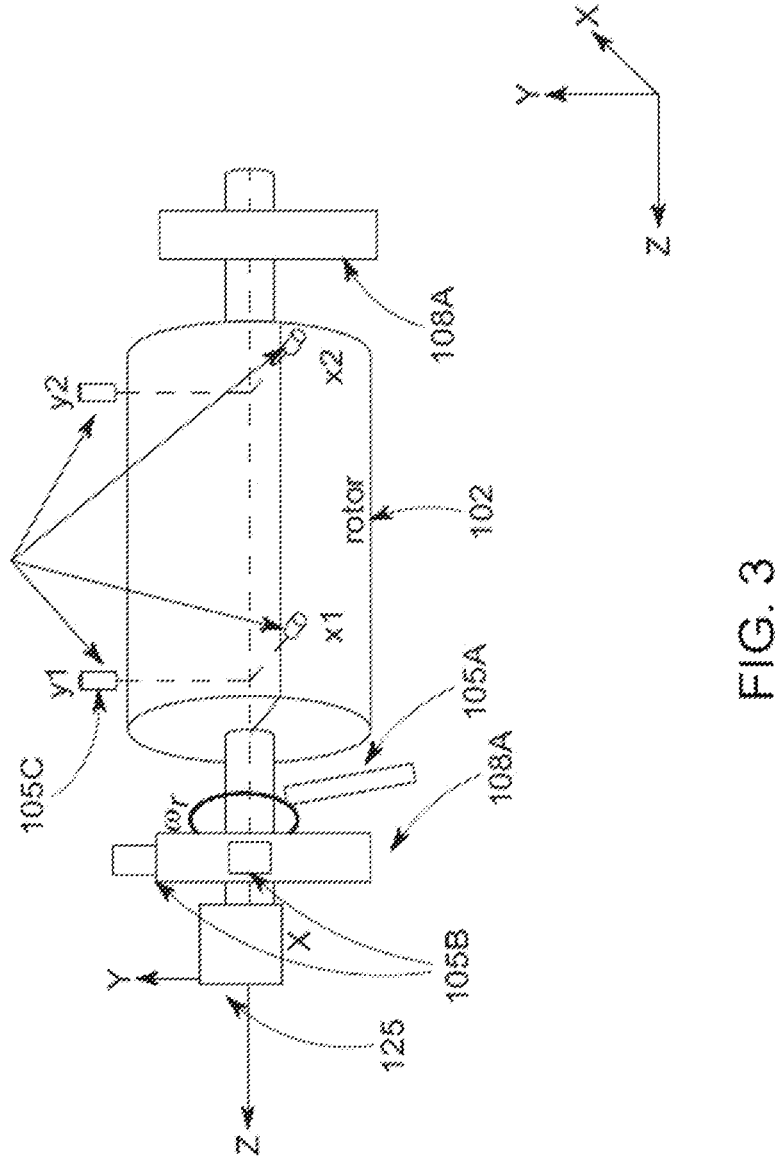
FIG. 3 shows a schematic diagram illustrating an experimental set-up for the motor, according to some embodiments of the present disclosure.

FIG. 3 shows a schematic illustrating an experimental set-up of the motor 101, according to some embodiments of the present disclosure. In an embodiment, the experimental set-up is used to generate data that may be collected, analyzed and used to identify type and severity of a fault associated with the motor 101. The experimental set-up shown in FIG. 3 may include interfacing of different components with the motor 101. In an example, the sensor 105A may refer to, but not limited to, a speed sensor such as a tachometer to measure an angular velocity or a rotational velocity $\omega_r$ of the motor 101. In an example, the sensor 105B may refer to, but not limited to, an acceleration sensor. In an example, the sensor 105C may refer to, but not limited to, air gap sensors. In an embodiment, two pairs of air gap sensors are utilized to measure the air gap 124. A first pair of the air gap sensors may be installed at a position denoted by $(x_1, y_1)$. A second pair of the air gap sensors may be installed at a position denoted by $(x_2, y_2)$. In an embodiment, the stator 104 of the motor 101 is mounted on a linear stage such that a position of the stator 104 is adjustable in a horizontal direction (x-axis) by a pair of micrometers. Two pairs of air gap sensors 105C are installed on the stator 104. A first pair of displacement sensor is installed at a side facing air gap 124 at a load side and a second pair of displacement sensor is installed at a side opposite to the side facing the air gap 124. The two pairs of displacement sensors 105C measure a dimension of the air gap 124 in the horizontal direction (x-axis) and a vertical direction (y-axis) when the motor 101 operates at the angular velocity $\omega_r$. A power brake is connected to the motor 101 and serves as a load 125.

In an example, the air gap 124 between the stator 104 and the rotor 102 is adjusted to create various eccentricity levels. Phase current sensors are utilized to measure phase current signals corresponding to each eccentricity level. In an embodiment, a 0.75 kW, three-phase, 2-pole-pair squirrel-cage induction motor with a nominal air gap size of 0.28 mm is used as the motor 101. In another embodiment, a 0.75 kW, three-phase synchronous motor with a nominal air gap size of 0.28 mm is used as the motor 101. Line-to-line voltage and frequency are 200 V and 60 Hz, respectively.

In an embodiment, six eccentricity levels are created when the motor 101 is at stand still. Data from the phase current sensors and the air gap sensors 105C are recorded for each eccentricity level at, for example, 10 kHz sampling frequency under no-load condition. In an example, but not limited to, the eccentricity levels may be set at 1.5%, 17.2%, 24.1%, 40.5%, 47.1%, or 64.6% respectively, with percentage defined as the ratio of the maximum air gap deviation and the nominal air gap size. From the data of the air gap sensors 105C, the actual static eccentricity of the air gap 124 is remarkably close to the initial settings, with difference within 3% in all cases. In additional, a small dynamic eccentricity level of around 6% exists for all cases according to air gap sensor readings. This mixed eccentricity effect create a side band signal at fc=fs±fr, where fs is the supply frequency and fr is the rotation frequency.

Figure 4:
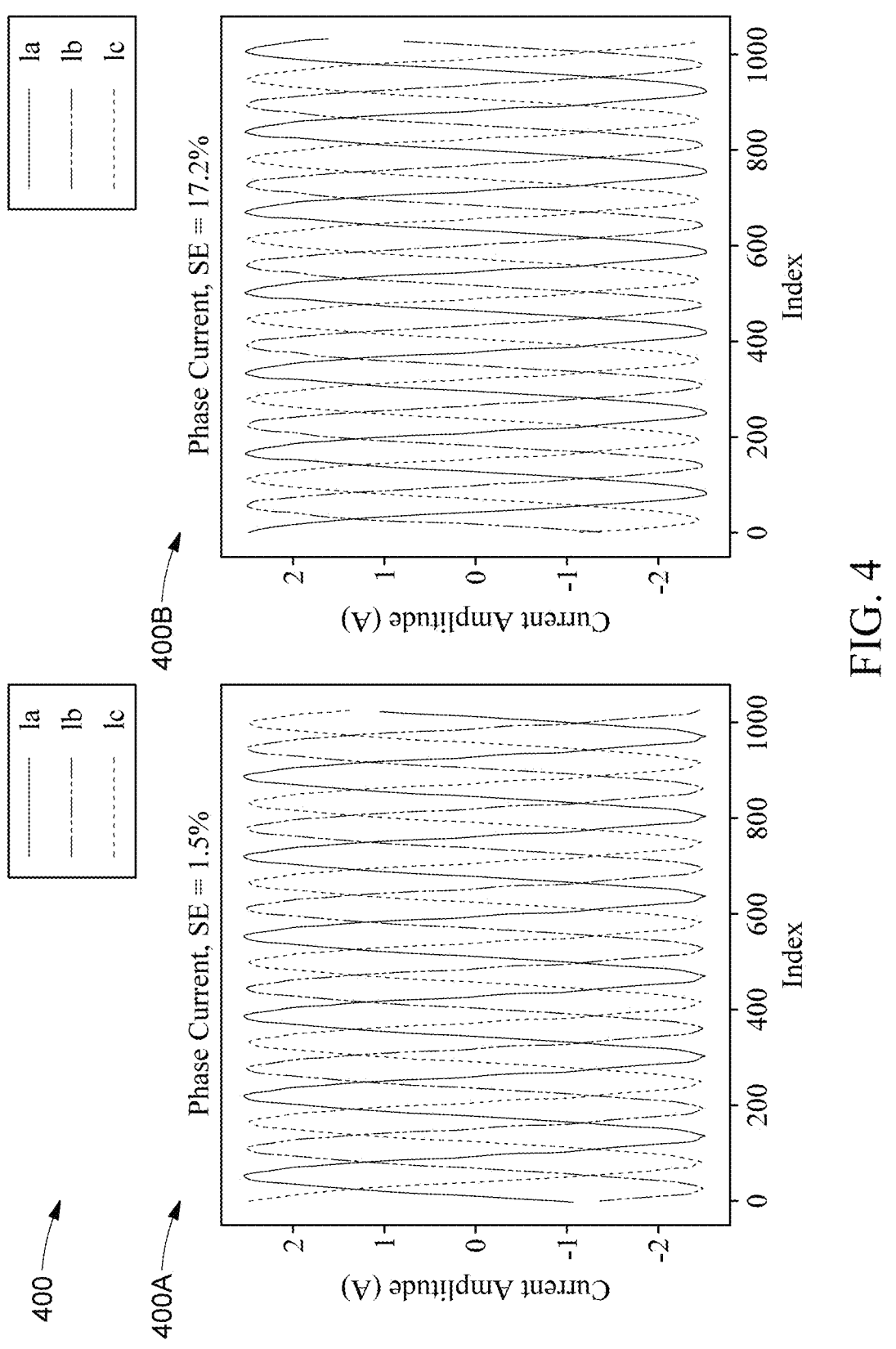
FIG. 4 shows a graphical representation of time-domain current signals for different eccentricity levels in the motor, according to some embodiments of the present disclosure.
Figure 4:
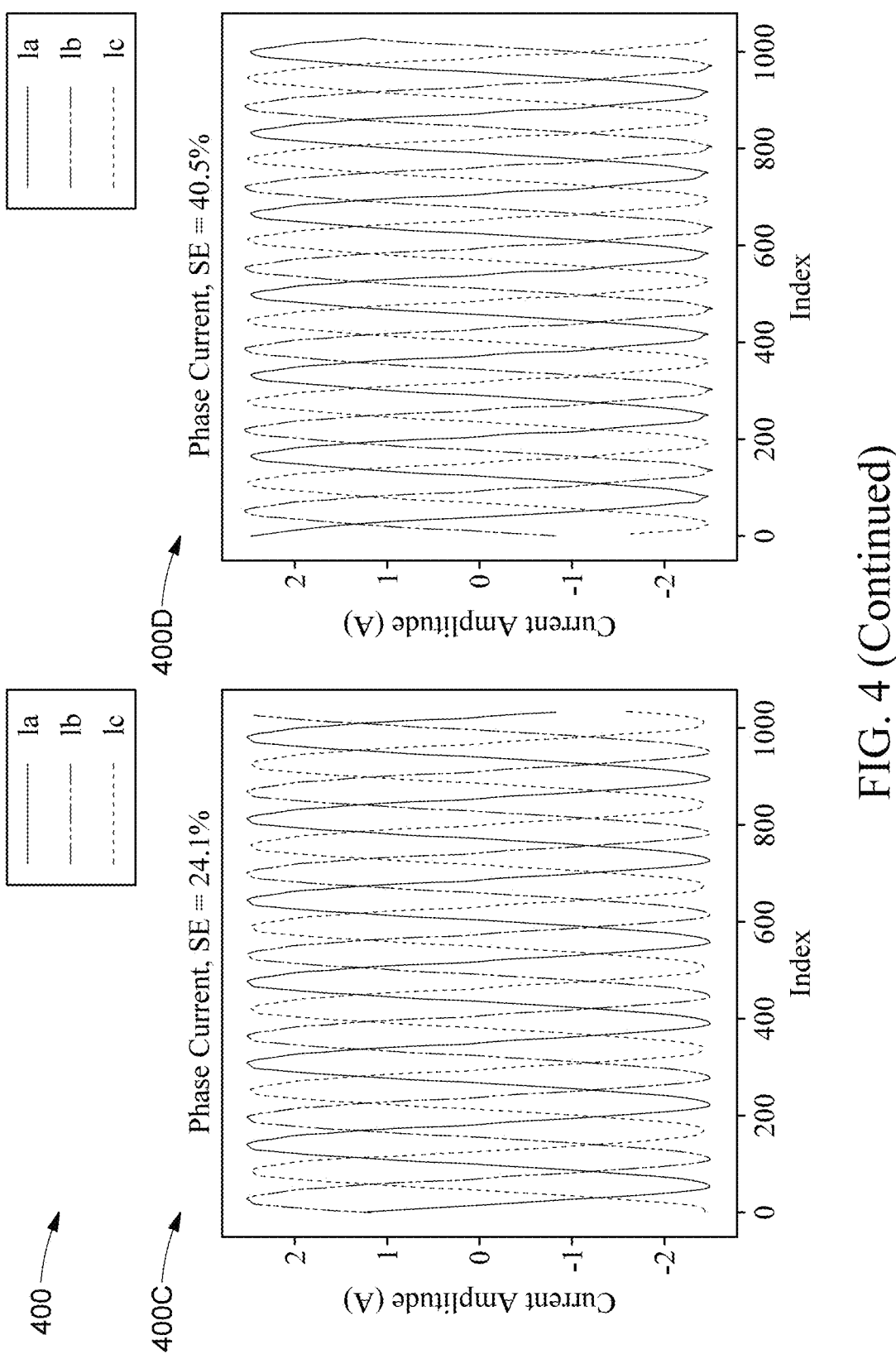
Figure 4:
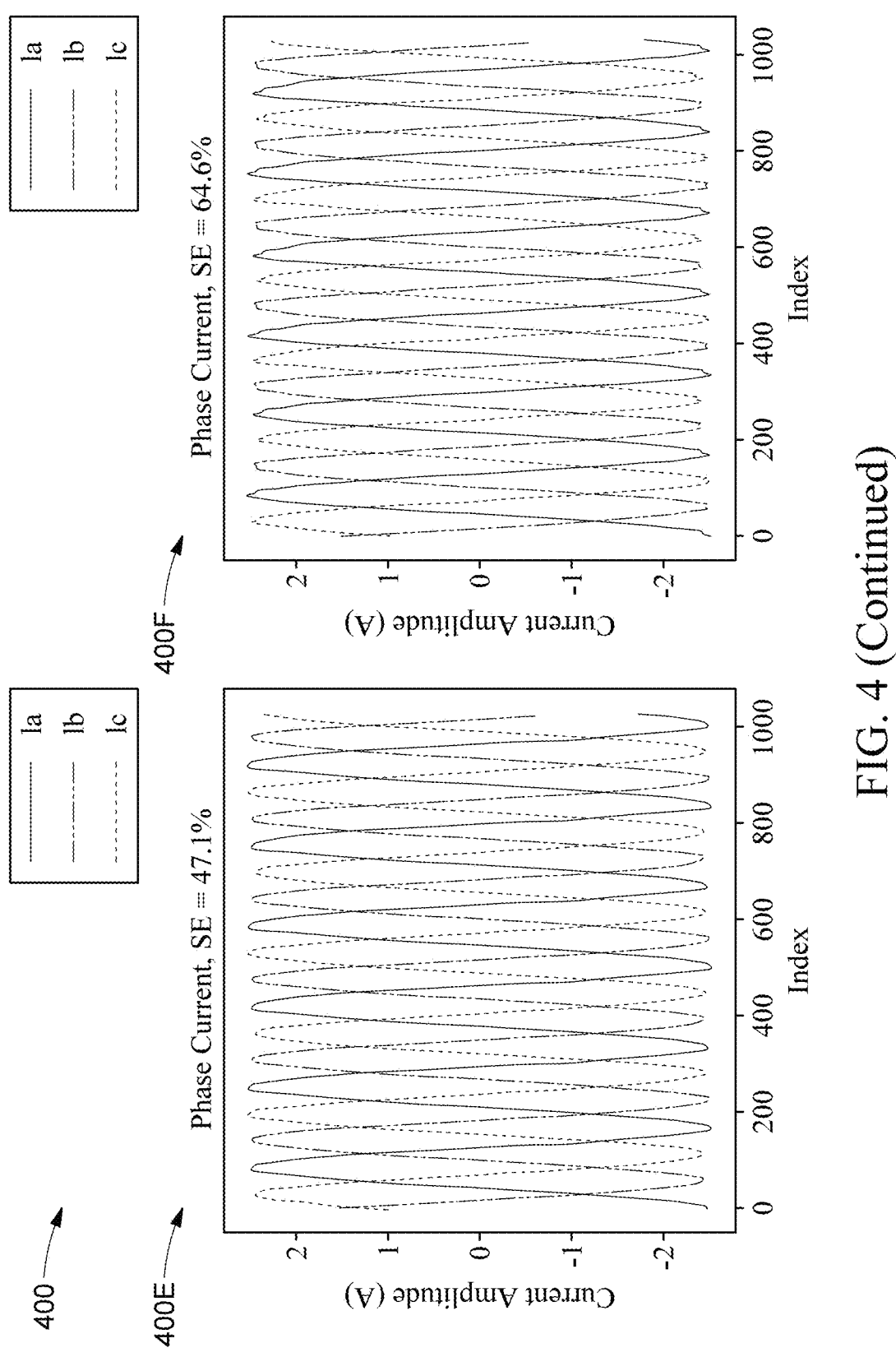

FIG. 4 shows a block diagram 400 including graphical representation of time-domain current signals for different eccentricity levels in the motor 101, according to some embodiments of the present disclosure. The block diagram 400 includes results of measurement performed by the sensors 105A, 105B, 105C on the motor 101 for different eccentricity levels. In an example, the three phase current signals associated with the stator 104 are measured for eccentricity levels set at, but not limited to, 1.5%, 17.2%, 24.1%, 40.5%, 47.1%, or 64.6% respectively.

In an example, a graph 400A shows the results of measurement performed by the sensors 105A, 105B, 105C on the motor 101 for an eccentricity level set at 1.5%. A graph 400B shows the results of measurement performed by the sensors 105A, 105B, 105C on the motor 101 for an eccentricity level set at 17.2%. A graph 400C shows the results of measurement performed by the sensors 105A, 105B, 105C on the motor 101 for an eccentricity level set at 24.1%. A graph 400D shows the results of measurement performed by the sensors 105A, 105B, 105C on the motor 101 for an eccentricity level set at 40.3%. A graph 400E shows the results of measurement performed by the sensors 105A, 105B, 105C on the motor 101 for an eccentricity level set at 47.1%. A graph 400F shows the results of measurement performed by the sensors 105A, 105B, 105C on the motor 101 for an eccentricity level set at 64.6%.

The time-domain current signals are sampled at, for example, 10 kHz sampling frequency. As an example, but not limited to, approximately 1000 data samples of the time-domain current signals are plotted to represent the time-domain signals in the graphical representation in FIG. 4. From the time-domain current signals, which are shown in FIG. 4, it is difficult to distinguish the eccentricity levels directly as the fundamental component dominates. the TDA method and a process of applying the TDA to eccentricity fault feature extraction and eccentricity level prediction is introduced.

Figures 5A, 5B:
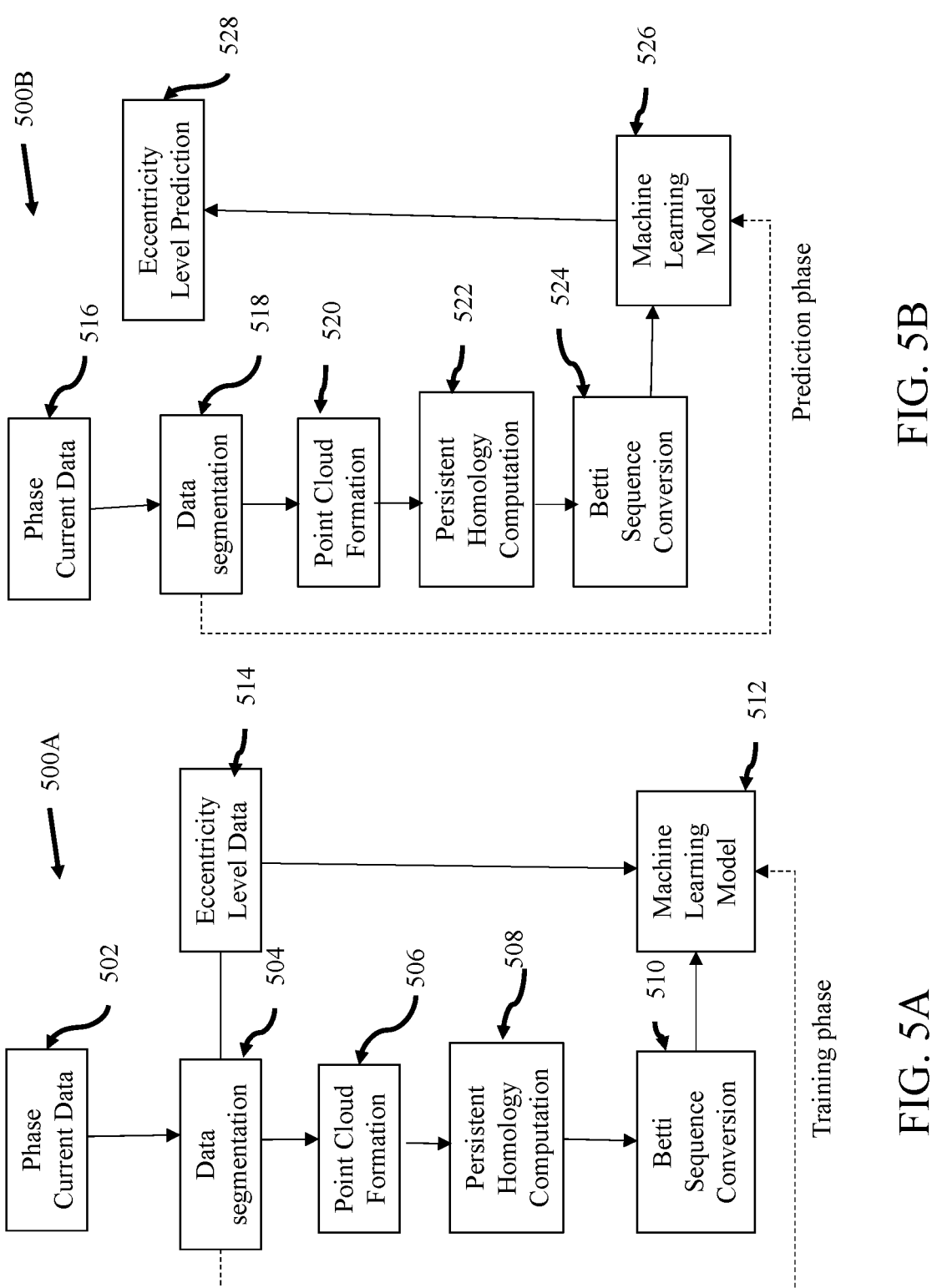
FIG. 5A shows an exemplary method for determining a fault in the motor, according to some embodiments of the present disclosure.
FIG. 5B shows an exemplary method for determining the fault in the motor, according to some embodiments of the present disclosure.

FIG. 5A shows an exemplary method 500A for determining a fault in the motor 101, according to some embodiments of the present disclosure. The method 500A is used for training a machine learning model for determining the fault in the motor 101 using the TDA process, according to an embodiment of the present disclosure. The method 500A applies the TDA process on the time-domain current signals associated with the stator 104 of the motor 101 to determine topological features that persist across different scales. The topological features associated with a point cloud representation of the samples of the time-domain current signals for different eccentricity levels may be fed to the machine learning model as training data for identifying the eccentricity fault and a level of the eccentricity fault. The steps identified in FIG. 5A, and the order thereof, are exemplary and may include various alternatives, equivalents, or derivations thereof including but not limited to the order of execution of the same. The steps of the method 500A of FIG. 5A, and its various alternatives, may be embodied in hardware or software including a computer-readable storage medium (e.g., optical disc, memory card, or hard drive) including instructions executable by the processor 120.

At 502, the fault detector 100A may collect, over the communication channel 107 including one or a combination of the wired and the wireless communication link, an electrical feedback signal of an operation of the motor 101 including time-series data of the time-domain current signals measured during a period of the operation of the motor 101. In an embodiment, the time series data of the time-domain current signals include the three phase current signals associated with the stator 104 such that the three phase current signals are measured for eccentricity levels set at, but not limited to, 1.5%, 17.2%, 24.1%, 40.5%, 47.1%, or 64.6% respectively. The description of the time-domain current signals is explained in detail with reference to FIG. 3 and FIG. 4. The time-domain current signals are measured for a pre-defined period of time depending on a sampling rate employed for segmenting the time-domain current signals. In an example, the time-domain current signals are measured during a period of, but are not limited to, 0.01 second for a sampling rate of 10 kHz.

At 504, the fault detector 100A may segment each time-domain current signal of the time-domain current signals for the three phases into data points of length L. The length L of the data sample may be set to, but are not limited to, 1000 as shown in FIG. 4. The length L defines the accuracy of the segmented time-domain current signals.

At 506, the fault detector 100A may map the data points of the time series data into a three-dimensional space of the three-phase current signals to form a three-phase point cloud corresponding to each eccentricity level. In an example, the eccentricity levels may be set at, but not limited to, 1.5%, 17.2%, 24.1%, 40.5%, 47.1%, or 64.6% respectively. A collection of the data points with a definition of a distance is referred as a point cloud. The description of the three-phase point cloud corresponding to each eccentricity level is explained with reference to FIG. 6.

At 508, the fault detector 100A may perform persistent homology computation on the three-phase point cloud to extract a topological representation of topological features of the three-phase point cloud using the TDA. The persistent homology computation examines the three-phase point cloud at different scales. The fault detector 100A may determine the topological representation as a representation of the persistent homology. The representation of the persistent homology may include one or a combination of a persistence barcode and a persistence diagram. The description of the persistence barcode is explained with reference to FIG. 7A and FIG. 7B. The description of the persistence diagram is explained with reference to FIG. 9. In an example, the fault detector 100A may compute the persistent homology of the three-phase point cloud corresponding to each eccentricity level, for 0-dimensional holes H0 and 1-dimensional holes H1. The 0-dimensional holes H0 may also be referred as $H_0$ features which correspond to a number of clusters formed by connected components in the three-phase point cloud. The 1-dimensional holes $H_1$ may also be referred as $H_1$ features which correspond to holes formed by spaces enclosed by surrounding connected components in the three-phase point cloud. In an example, the topological features tracked by the persistent homology may include the $H_0$ features and the $H_1$ features. The persistent homology is a tool in the TDA for investigating a structure of data, for example, the three-phase point cloud for the time series data. The persistent homology is robust to perturbations of the time series data, independent of dimensions and coordinates, and provides a compact representation of the qualitative features of the time series data.

The three-phase point cloud is represented as finite metric spaces. From a topological point of view, the finite metric spaces do not contain any interesting information. Thus, a thickening of the point cloud at different scales of resolution is required and then evolution of the resulting shape across the different resolution scales is analyzed. The qualitative features are given by topological invariants. The variation of such topological invariants across the different resolution scales is represented in a compact way to summarize the 'shape' of the time series data.

The description of the method for the persistent homology computation of the three-phase point cloud in finite metric spaces is explained in detail with reference to FIG. 8.

At 510, the fault detector 100A may convert the H0 homology and the H1 homology for the three-phase point cloud into Betti sequences of fixed lengths L1 and L2 respectively. The topological features extracted at 508 are used as inputs or training data for a regression model or the machine-learning model. However, it is more convenient to represent the topological features by vectors of same length. For this purpose, the fault detector 100A derives the Betti sequence or Betti curve from persistence diagrams of the time series data of three-phase current for different eccentricity levels. The description of Betti sequence is explained in detail with reference to FIG. 9 and FIG. 10.

At 512, the fault detector 100A may feed training data to the machine learning model. The machine learning model may include a regression model or a neural network. In training phase of the machine learning model, mean squared error of eccentricity level predicted from the model is matched with the ground truth eccentricity level obtained from eccentricity level data 514. In an example, the eccentricity level data 514 is a label of the segmented time-domain current signals and the time-series data of the time-domain current signals. The eccentricity level data 514 may also indicate conditions at which the time-domain current signals are collected.

The machine learning model may be trained to predict the eccentricity level of the motor 101. In an example, the machine learning model may be trained in a supervised manner to classify different topological representations labeled with the type of the eccentricity, the level of severity of the eccentricity, or both. The prediction of the eccentricity includes the type of the eccentricity and the level of severity of the eccentricity. As an example, but not limited to, the type of the eccentricity may include the static eccentricity, the dynamic eccentricity, or the mixed eccentricity. The level of the eccentricity may indicate a degree of the air gap 124 between the stator 104 and the rotor 102 of the motor 101. The training data fed to the machine learning model is labeled data that includes one or a combination of the Betti sequences derived at 510, eccentricity level data 514, or the data points corresponding to the time-domain current signals for the three phases.

FIG. 5B shows an exemplary method 500B for determining the fault in the motor 101, according to an embodiment of the present disclosure. The method 500B applies the TDA on the time-domain current signals associated with the stator 104 of the motor 101 to determine topological features that persist across different scales. The topological features associated with the point cloud representation of the samples of the time-domain current signals for different eccentricity levels may be fed to the trained machine learning model for predicting and identifying the eccentricity fault and the level of the eccentricity fault. The steps identified in FIG. 5B, and the order thereof, are exemplary and may include various alternatives, equivalents, or derivations thereof including but not limited to the order of execution of the same. The steps of the process of FIG. 5B, and its various alternatives, may be embodied in hardware or software including a computer-readable storage medium (e.g., optical disc, memory card, or hard drive) including instructions executable by the processor 120.

At 516, the fault detector 100A may collect, over the communication channel 107 including one or a combination of the wired and the wireless communication link, an electrical feedback signal of an operation of the motor 101 including time-series data of the time-domain current signals measured during the period of the operation of the motor 101 same as used at 502 during the training of the machine learning model. In another embodiment, the period of the operation may be vary depending on the sampling rate of the data points. In an embodiment, the time series data of the time-domain current signals include the three phase current signals associated with the stator 104 such that the three phase current signals are measured for eccentricity levels set at, but not limited to, 1.5%, 17.2%, 24.1%, 40.5%, 47.1%, or 64.6% respectively. The description of the time-domain current signals is explained in detail with reference to FIG. 3 and FIG. 4.

At 518, the fault detector 100A may segment each time-domain current signal of the time-domain current signals for the three phases into data points of length L. The length L of the data sample may be set to, but are not limited to, 1000 as shown in FIG. 4. The length L defines the accuracy of the segmented time-domain current signals.

Figure 6:
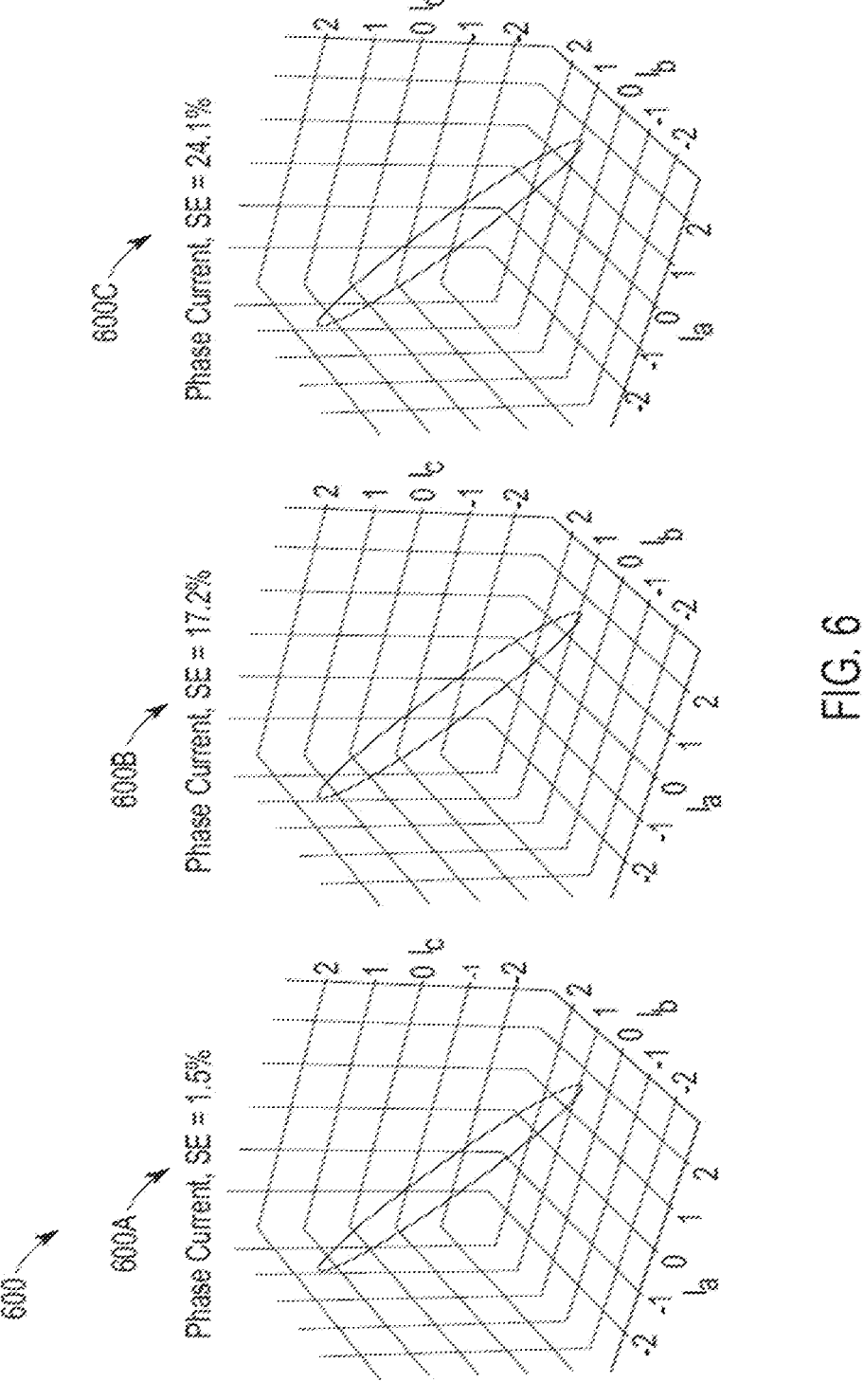
FIG. 6 shows a graphical representation of three-phase point cloud for different eccentricity levels, according to some embodiments of the present disclosure.
Figure 6:
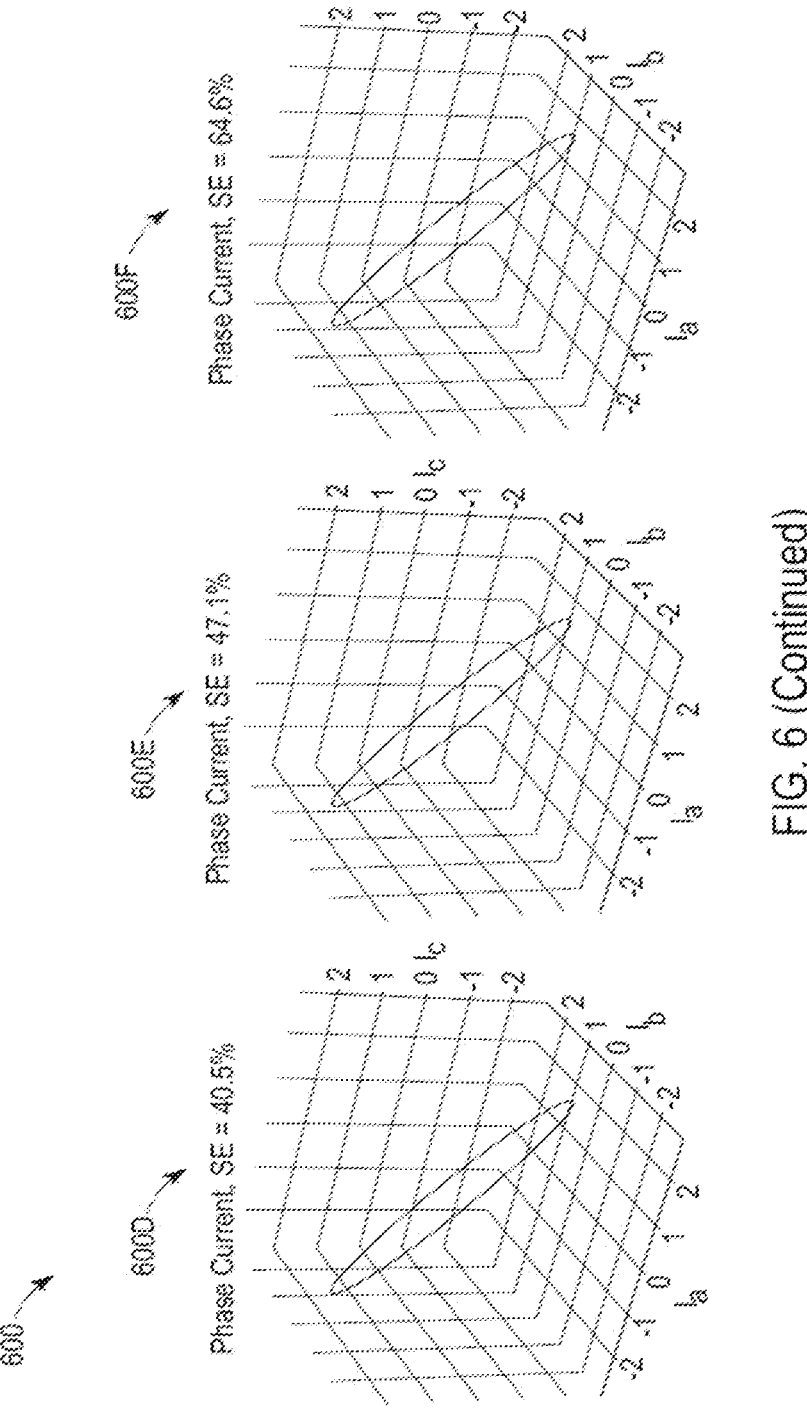

At 520, the fault detector 100A may map the data points of the time series data into a three-dimensional space of the three-phase current signals to form a three-phase point cloud corresponding to each eccentricity level. In an example, the eccentricity levels may be set at, but not limited to, 1.5%, 17.2%, 24.1%, 40.5%, 47.1%, or 64.6% respectively. A collection of the data points with a definition of a distance is referred as a point cloud. For example, FIG. 6 shows a graphical representation of the three-phase point cloud for different eccentricity levels, according to another embodiment of the present disclosure. Each three-phase point cloud is formed for the three phase current signals measured for a particular eccentricity level. The distance between the data points may be, for example, a Euclidean distance or a Minkowski distance. Both the Euclidean distance and the Minkowski distance are defined on numeric data. However, the present embodiment is not limited to entirely numeric data to define the distance between the data points. In another example, the distance may also be defined when the data is categorical rather than numeric.

At 522, the fault detector 100A may perform persistent homology computation on the three-phase point cloud to extract a topological representation of topological features of the three-phase point cloud using the TDA. In an example, the fault detector 100A may compute the persistent homology of the three-phase point cloud corresponding each eccentricity level, for 0-dimensional holes H0 and 1-dimensional holes H1.

At 524, the fault detector 100A may convert the H0 homology and the H1 homology for the three-phase point cloud into Betti sequences of fixed lengths L1 and L2 respectively. The fault detector 100A derives the Betti sequence or Betti curve from persistence diagrams of the time series data of three-phase current for different eccentricity levels. The description of Betti sequence is explained in detail with reference to FIG. 9 and FIG. 10.

At 526, the fault detector 100A may feed one or a combination of the Betti sequences derived at 524 or the data points corresponding to the time-domain current signals to the machine learning model trained at 512. In an embodiment, the fault detector 100A may execute the machine learning model trained at 512 in a supervised manner to classify different topological representations labeled with the type of the eccentricity, the level of severity of the eccentricity, or both. The trained machine learning model may classify the eccentricity of the motor 101 based on the extracted topological representation. In an embodiment, the trained machine learning model may classify the eccentricity of the motor 101 based on one or a combination of the Betti sequences derived at 524 or the data points. The eccentricity level prediction 528 includes a type of the eccentricity and a level of severity of the eccentricity. In an example, the machine learning model may be a regression model which is trained at 512 to extrapolate labeled levels of severity of the eccentricity used for the training of the regression model at 512.

FIG. 6 shows a block diagram 600 including a graphical representation of the three-phase point cloud for different eccentricity levels, according to an embodiment of the present disclosure. The block diagram 600 may include the three-phase point cloud for different eccentricity levels set at, but not limited to, 1.5%, 17.2%, 24.1%, 40.5%, 47.1%, or 64.6% respectively.

In an example, a graph 600A shows the three-phase point cloud for the three phase current signals measured for an eccentricity level set at 1.5%. A graph 600B shows the three-phase point cloud for the three phase current signals measured for an eccentricity level set at 17.2%. A graph 600C shows the three-phase point cloud for the three phase current signals measured for an eccentricity level set at 24.1%. A graph 600D shows the three-phase point cloud for the three phase current signals measured for an eccentricity level set at 40.3%. A graph 600E shows the three-phase point cloud for the three phase current signals measured for an eccentricity level set at 47.1%. A graph 600F shows the three-phase point cloud for the three phase current signals measured for an eccentricity level set at 64.6%.

Each three-phase point cloud is formed for the three phase current signals measured for a particular eccentricity level. The distance between the data points in a particular point cloud may be, for example, a Euclidean distance or a Minkowski distance. Both the Euclidean distance and the Minkowski distance are defined on numeric data. However, the present embodiment is not limited to entirely numeric data to define the distance between the data points. In another example, the distance may also be defined when the data is categorical rather than numeric.

Since the dominating component of the three phase current signals is a periodic wave of fundamental frequency, the most significant shape is a large circle in 3D space. The most significant shape is a dominant shape in the three-phase point cloud. For ideal sinusoidal signals, the shape of the three-phase point cloud would be a perfect circle. However, when components other than the fundamental frequency exist, the points on the three-dimensional point cloud would deviate from the perfect circle. The components other than the fundamental frequency result from the faults such as eccentricity faults and are referred to as fault components. Since the fault components are much smaller in amplitude, it is difficult to tell the different eccentricity levels from the shape of the three-phase point cloud alone. The components other than the fundamental frequency may result in topological features other than the dominant shape in the three-phase point cloud. Thus, when the operation of the motor 101 suffers from any of the eccentricity faults, the topological features in the three-phase point cloud of the three-phase current may include at least one dominant shape and at least one shape other than the dominant shape.

After going through the TDA process, the topological features may be extracted from the three-phase point cloud and the extracted topological features may be fed into the machine learning model for training and eccentricity level prediction for the motor 101.

Figures 7A, 7B:
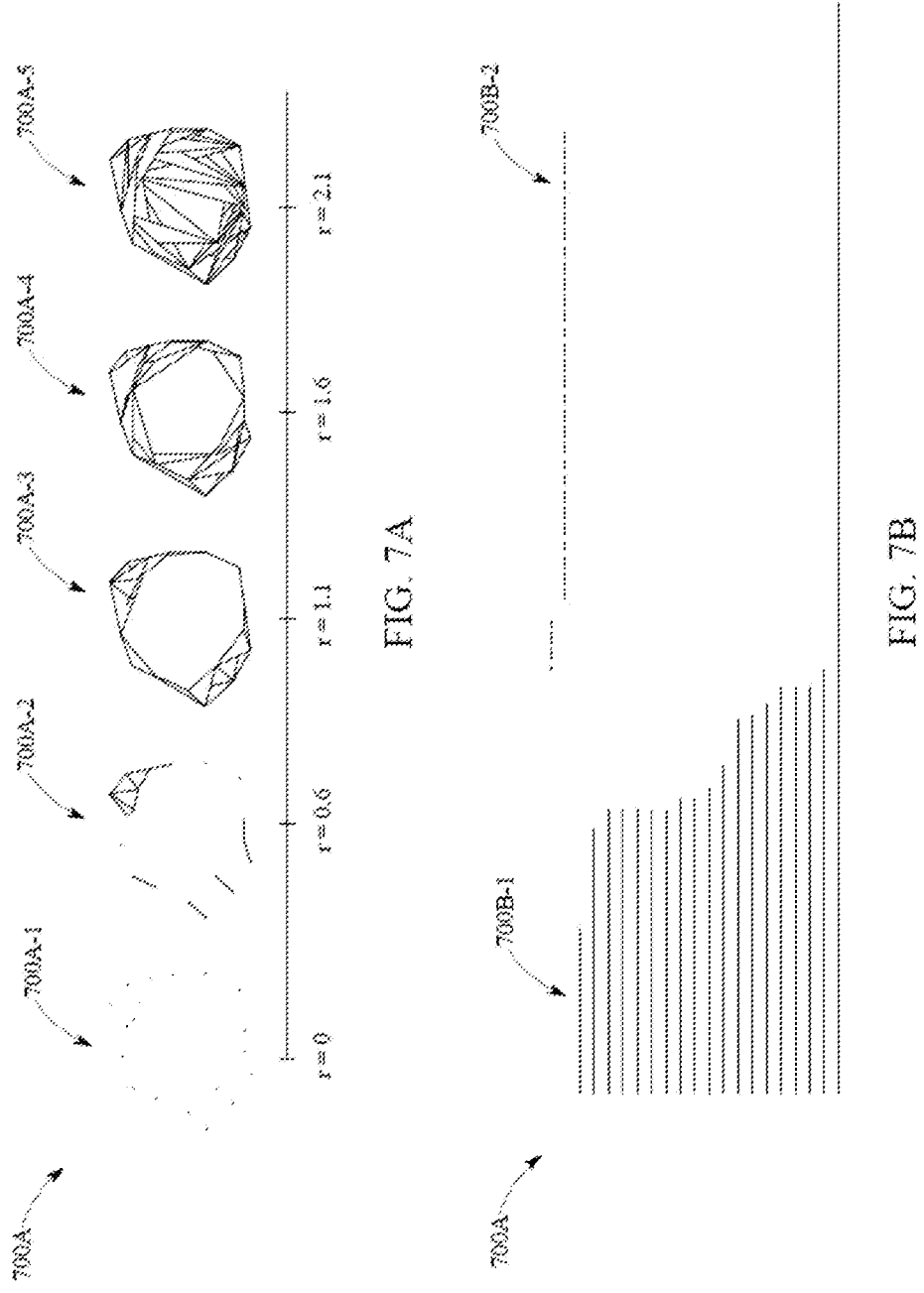
FIG. 7A shows an exemplary representation of data points in a finite metric space, according to some embodiments of the present disclosure.
FIG. 7B shows an exemplary representation of bar codes for a finite metric space, according to some embodiments of the present disclosure.

FIG. 7A shows an exemplary representation 700A of the data points in the finite metric space, according to an embodiment of the present disclosure. The data points are represented in a region $R^2$. The distance between two data points is referred to as a filtration radius r. For different values of r, a space $S_r$ composed of vertices, edges, triangles, or higher-dimensional polytopes are constructed based on certain rules. In an example, an edge between two points i and j is included if and only if the Euclidean distance between the points i and j is no larger than the filtration radius r, a triangle is included if and only if all of its edges are in $S_r$, a tetrahedron is included if and only if all of its face triangles are in $S_r$. By using homology, several features of the space $S_r$ may be measured. The features of the space $S_r$ or the topological features may include components, holes, and/or voids.

700A-1 illustrates an exemplary point cloud when the filtration radius r is near to zero (r=0). With r=0, no topological feature, for example, an edge or vertices may be formed and all the data points in the point cloud may be represented as separate data points with no connecting feature between them. As the filtration radius r increases, the topological features start appearing in the point cloud. 700A-2 illustrates an exemplary point cloud when the filtration radius r is set to 0.6. 700A-3 illustrates an exemplary point cloud when the filtration radius r is set to 1.1 in which a hole appears. In an example, at the filtration radius r=1.1, the hole starts to appear. 700A-4 illustrates an exemplary point cloud when the filtration radius r is set to 1.6. In an example, at the filtration radius r=1.6, the hole appeared for a smaller value of the filtration radius still exists in the point cloud, but the radius of the hole is decreased as compared to the hole at 700A-3. 700A-5 illustrates an exemplary point cloud when the filtration radius r is set to 2.1. In an example, at the filtration radius r=2.1, the hole vanishes in the point cloud.

A lifespan of the features such as, the hole, may be represented using a finite collection of intervals known as a persistence barcode. The left endpoint of an interval represents the birth of a feature, and the right endpoint of the interval represents the death of the same feature. For example, FIG. 7B shows an exemplary representation 700B of the bar codes for the finite metric space, according to an embodiment of the present disclosure. As the filtration radius is increased, a topological feature, for example, a hole appears at a first value $r_1$ (for example, r=1.1) of the filtration radius r. As the filtration radius r is further increased, a size of the hole appears to decrease and gradually the hole vanishes at a second value $r_2$ (for example, r=2.1) of the filtration radius r. The first value $r_1$ of the filtration radius r marks the birth of the hole and the second value $r_2$ of the filtration radius r marks the death of the hole. The persistence of the hole may be represented as a pair $(r_1, r_2)$. The persistence may be visualized as an interval or a bar known as the persistence bar from $r_1$ to $r_2$. The persistence bar is a visual representation of the persistence of the hole. A collection of the persistence bar for each topological feature in the three-phase point cloud is referred to as the persistence barcode.

Figure 8:
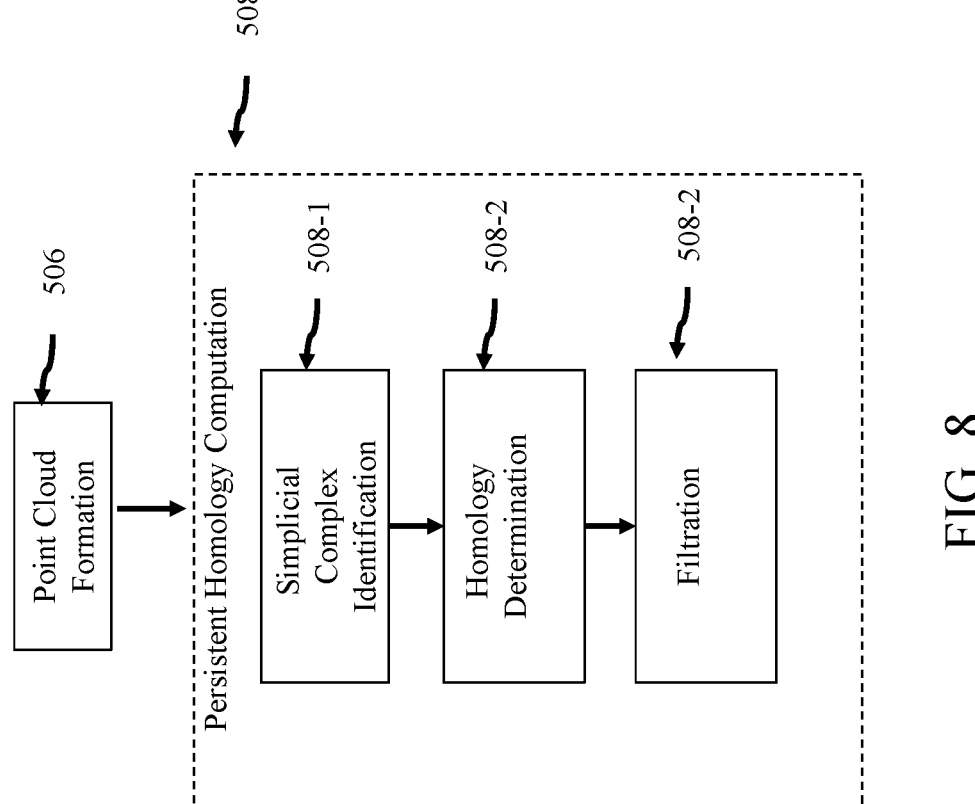
FIG. 8 shows an exemplary method of persistent homology computation of three-phase point cloud in finite metric spaces, according to some embodiments of the present disclosure.
Figure 8:

FIG. 8 shows an exemplary method 800 of the persistent homology computation of the three-phase point cloud in the finite metric spaces, according to some embodiments of the disclosure. The steps identified in method 800 of FIG. 8, and the order thereof, are exemplary and may include various alternatives, equivalents, or derivations thereof including but not limited to the order of execution of the same. The steps of the method 800 of FIG. 8, and its various alternatives, may be embodied in hardware or software including a computer-readable storage medium (e.g., optical disc, memory card, or hard drive) including instructions executable by the processor 120.

First, the time series data represented with the three-phase point cloud, which is formed by the data points sampled from the time series data, is fed to the processor 120 for the persistent homology computation 508.

At 508-1, a simplicial complex of the three-phase point cloud is identified for each of the eccentricity levels. In an embodiment, the topological representation of the topological features of the three-phase point cloud is extracted using the TDA. The simplicial complex is a collection of fundamental topological features or simplices such as, for example, points, edges, or triangles. However, the features or simplices are not limited to the points, edges, or triangles. Tetrahedra or other higher dimensional polytopes may also be used as the topological features or simplices. In an embodiment, Rips complex is used as an algorithm to extract the topological representation of the topological features of the three-phase point cloud. However, other algorithms may also be used for constructing the simplicial complex. It is defined with a threshold value r, called the filtration radius, and includes only complies with pairwise Euclidean distance between points no larger than the filtration radius r.

At 508-2, the homology is determined using linear algebra from the constructed simplicial complex. For example, the H0 homology counts the number of connected components, and the H1 homology counts the number of holes.

At 508-3, the persistent homology is obtained through a filtration process, by computing the homology with different filtration radius r, and tracking the birth and death of the topological features at corresponding values of the filtration radius r. The birth and death of the topological features defines lifespans of the topological features for different filtration radius r.

There are different ways of representing the persistent homology, and a persistence diagram is one of the most popular choices. The persistence diagram is a set of points $(b,d)|b,d \in R^2$ and d>b, where each point corresponds to the birth and death of a topological feature in a corresponding family of simplicial complexes. In particular, each point (b,d) denotes a topological feature being "born" at radius b and "dead" at radius d. There are different algorithms for the filtration of Rips complexes and the computation of persistence diagrams, with implementations available by several software packages. The description of the persistence diagram is explained with reference to FIG. 9. The description of H0 and H1 persistence diagrams for the three-phase current data for six different eccentricity levels is explained with reference to FIG. 10.

Assume D is a persistence diagram with a finite number of off-diagonal points, with $\alpha = (b_\alpha, d_\alpha)$ a point in the diagram, and maximum filtration radius $$r_{max} > 0, \text{ let } \{r_i\}_1^M$$

be equally spaced points within [0, $r_{max}$], the Betti sequence of D is a vector of length M defined as $$\vec{\beta} = (\beta_i)_1^M,$$

with the entries $\beta_i$ count the number of points in the persistence diagram at filtration radius $r_i$ around the point clouds in the data space. The function is defined as:

$$f_\alpha(r) = \begin{cases} 1, & \&b_\alpha \leq x < 0 \\ 0, & \text{otherwise} \end{cases} \tag{1}$$

Then the points on the Betti sequence is obtained from the summation:

$$\beta_i = \Sigma_{\alpha \in D} f_\alpha(r_i) \tag{2}$$

The topological features in the persistent homology is a function of the filtration radius r. The representation of the persistent homology is obtained through filtration by computing the persistent homology with different filtration radius r as threshold values and tracking the lifespans of different topological features at corresponding threshold values. By confining the range of maximum filtration, "large" features of the data may be excluded, and only "small" features of the data may be kept. In an example, the TDA may filter out the "large" feature or the dominant shape from the topological features. In the case of motor fault detection, the fault-related features are much smaller in amplitude compared with the dominating fundamental signal corresponding to the power supply frequency. By choosing a small value of the filtration radius $r_{max}$, the dominating fundamental signal may be excluded and fault-related features from the topological calculation in the persistent homology represented in persistence diagrams and/or Betti sequences may be shown. Moreover, excluding the fundamental signal using the TDA is less complex and does not necessitate the need to know the exact power supply frequency. On the other hand, in conventional signal processing methods, the exact fundamental frequency needs to be known in order to filter it out. The exact frequency components that are related to the eccentricity fault does not need to be explicitly identified by physical model either, in contrast to conventional model based MCSA method.

Figure 9:
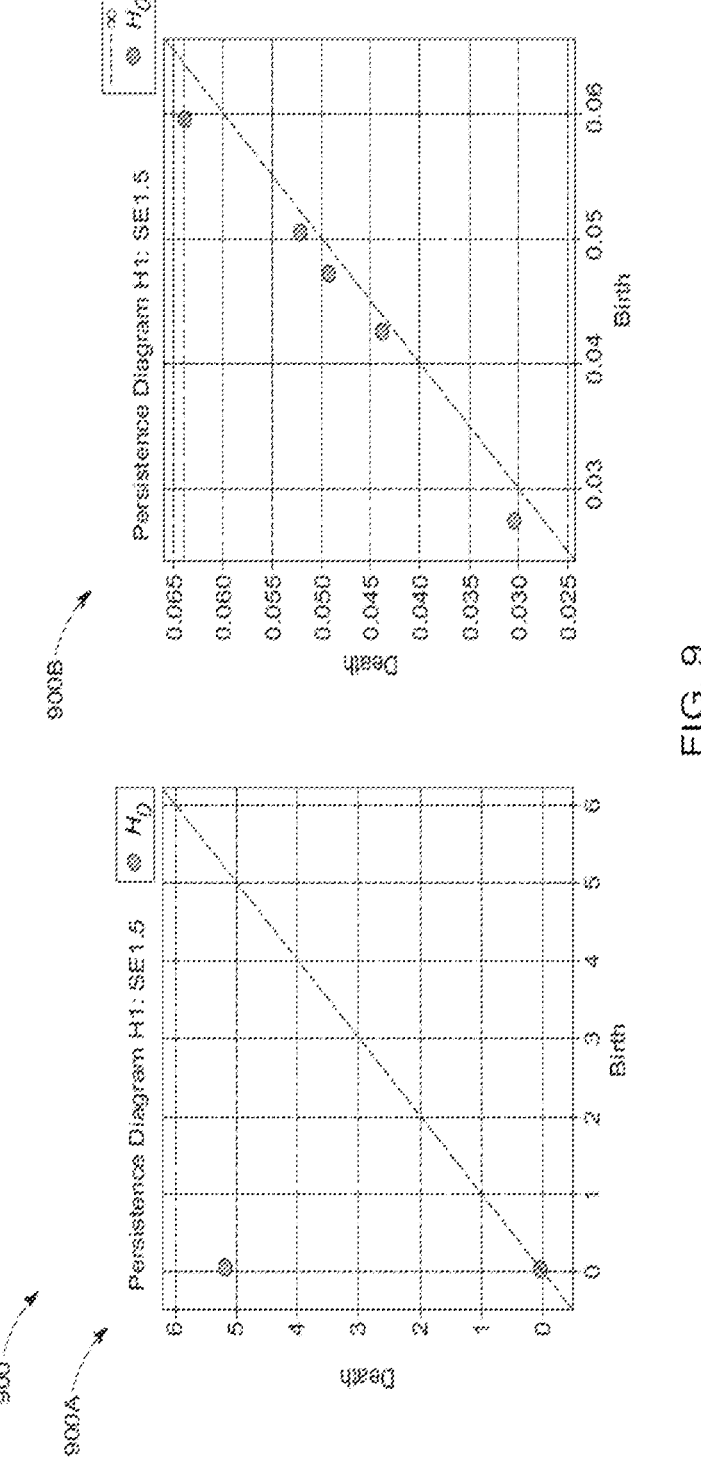
FIG. 9 shows a graphical representation of a persistence diagram, according to some embodiments of the present disclosure.

FIG. 9 shows a graphical representation 900 of the persistence diagram, according to some embodiments of the present disclosure. The graphical representation 900 includes a persistence diagram 900A and a persistence diagram 900B. The persistence diagram is a multiset that is the union of a finite multiset of points in $R^2$ with the multiset of points on the diagonal $\Delta=\{(x, y)\in R^2 | x=y\}$, where each point on the diagonal has infinite multiplicity. The persistence diagram 900A is the H1 persistence diagram for the eccentricity level set at 1.5%. The horizontal axis of the persistence diagram 900A denotes a birth of a topological feature, for example, a hole. The vertical axis of the persistence diagram 900A denotes a death of the same topological feature. The persistence diagram 900A is a collection of persistence barcodes for all the H1 features in the three-phase point cloud for the eccentricity level set at 1.5%. each persistence barcode in the persistence diagram 900A indicates a birth and a death of a corresponding H1 feature. The persistence barcode starts at the birth and ends at the death of the corresponding H1 feature. The birth of the H1 feature indicates a filtration radius r at which the H1 feature starts to appear. The death of the H1 feature indicates a filtration radius r at which the H1 feature starts to vanish. In a way, the persistence diagram 900A indicates a lifespan of each H1 feature in the three-phase point cloud for the eccentricity level set at 1.5%. As illustrated from the persistence diagram 900A, there are less features or only one feature which is born and died at large values of the filtration radii. As an example, a feature is termed as a major feature when it has large values of filtration radii for the death and birth as compared to other topological features in the three-phase point cloud. As illustrated in the persistence diagram 900A, a persistence barcode of the major feature is represented by the barcode on the top left side of the persistence diagram 900A. Further, smaller features are those topological features which have smaller values of filtration radii for the death and birth as compared to the major feature in the three-phase point cloud. As illustrated in the persistence diagram 900A, persistence barcodes of the smaller features are represented by the barcodes on the bottom left side of the persistence diagram 900A. As illustrated in the persistence diagram 900A, majority of the smaller features have a smaller range of filtration radii for the birth and death. The persistence diagram 900B illustrates a clearer visualization of the smaller features as shown in the persistence diagram 900A. In the persistence diagram 900B, a range of the horizontal axis and the vertical axis is reduced, for example, to r=0.06 for the birth and r=0.065 for the death.

Figure 10:
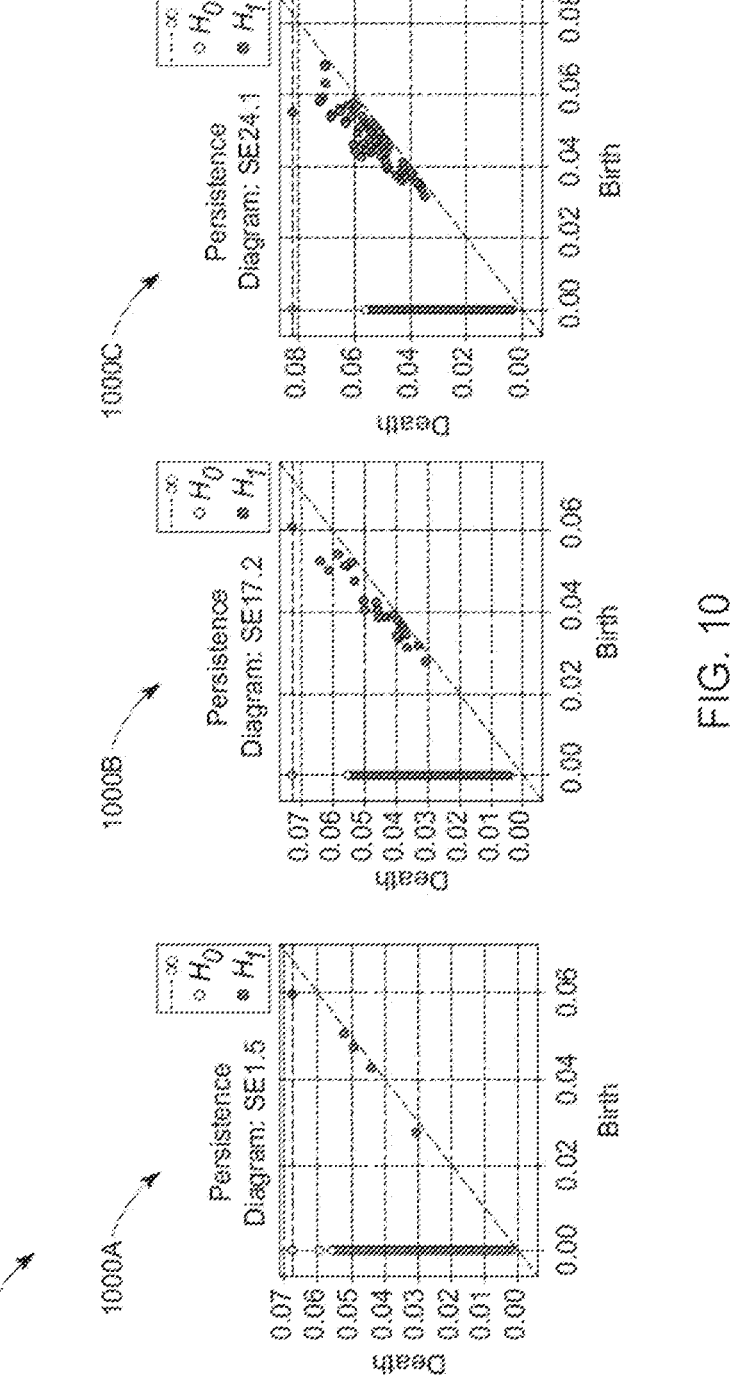
FIG. 10 shows persistence diagrams of the three-phase current for six different eccentricity levels, according to some embodiments of the present disclosure.
Figure 10:
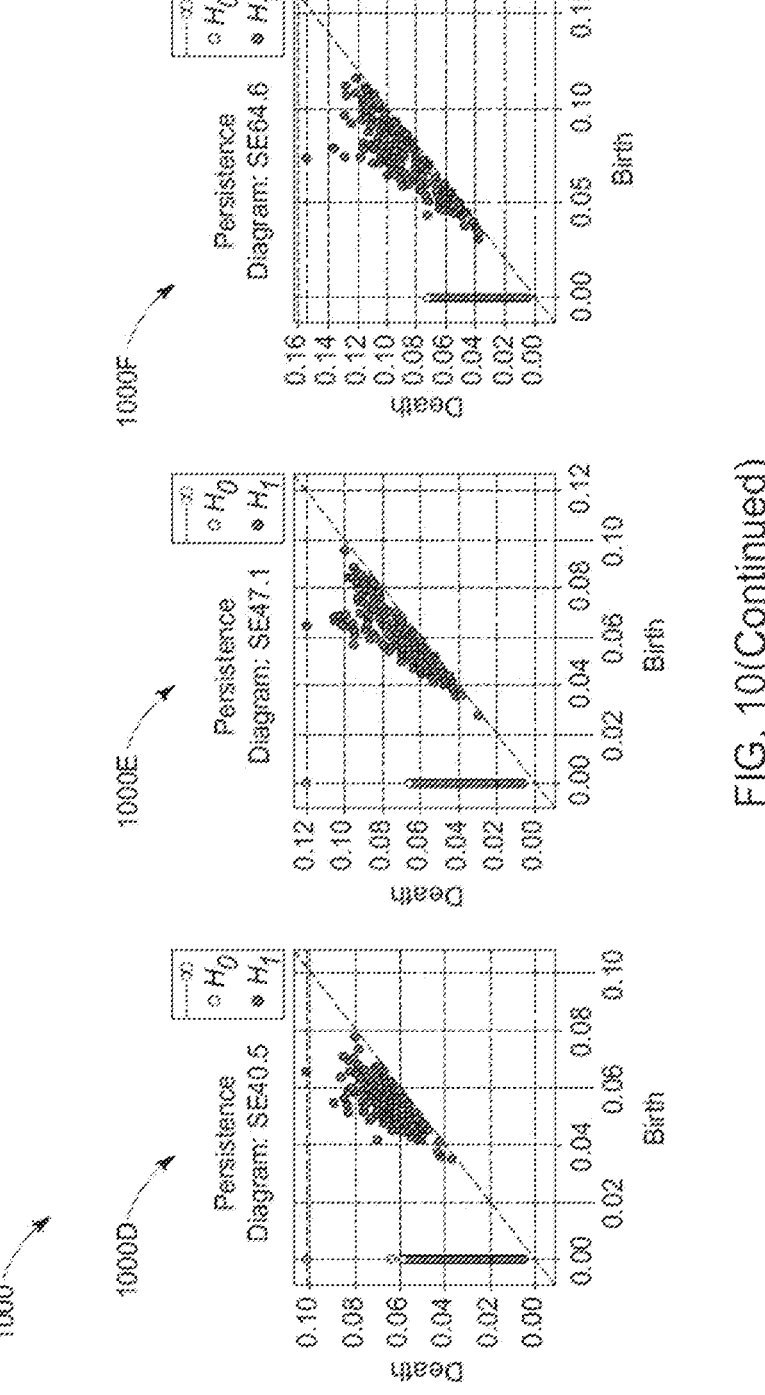

FIG. 10 shows a graphical representation 1000 of persistence diagrams of the three-phase current for six different eccentricity levels, according to some embodiments of the present disclosure. The graphical representation 1000 includes the H0 and H1 persistence diagrams for different eccentricity levels set at, but not limited to, 1.5%, 17.2%, 24.1%, 40.5%, 47.1%, or 64.6% respectively. In an embodiment, the H0 and H1 persistence diagrams of the three-phase current data for the six different eccentricity levels may be computed using the three-phase point cloud for the six different eccentricity levels. The most noticeable differences between these diagrams are the H1 features, which correspond to the small holes formed by neighboring points. For an ideal sinusoidal wave, only one large hole can be formed by its point cloud. When the eccentricity level is small, the deviation from the ideal circle is small, and only a few small features are formed in the H1 diagram. When the eccentricity level increases, the deviation of the points from the ideal circle is larger, and these points are more likely to form small circles during the filtration process 508-2 of obtaining the persistence diagram. Therefore, more features show up in the H1 persistence diagrams with increasing eccentricity level.

In an example, 1000A shows the H0 and H1 persistence diagrams of the three-phase current data for an eccentricity level set at 1.5%. 1000B shows the H0 and H1 persistence diagrams of the three-phase current data for an eccentricity level set at 17.2%. 1000C shows the H0 and H1 persistence diagrams of the three-phase current data for an eccentricity level set at 24.1%. 1000D shows the H0 and H1 persistence diagrams of the three-phase current data for an eccentricity level set at 40.3%. 1000E shows the H0 and H1 persistence diagrams of the three-phase current data for an eccentricity level set at 47.1%. 1000F shows the H0 and H1 persistence diagrams of the three-phase current data for an eccentricity level set at 64.6%.

Figure 11:
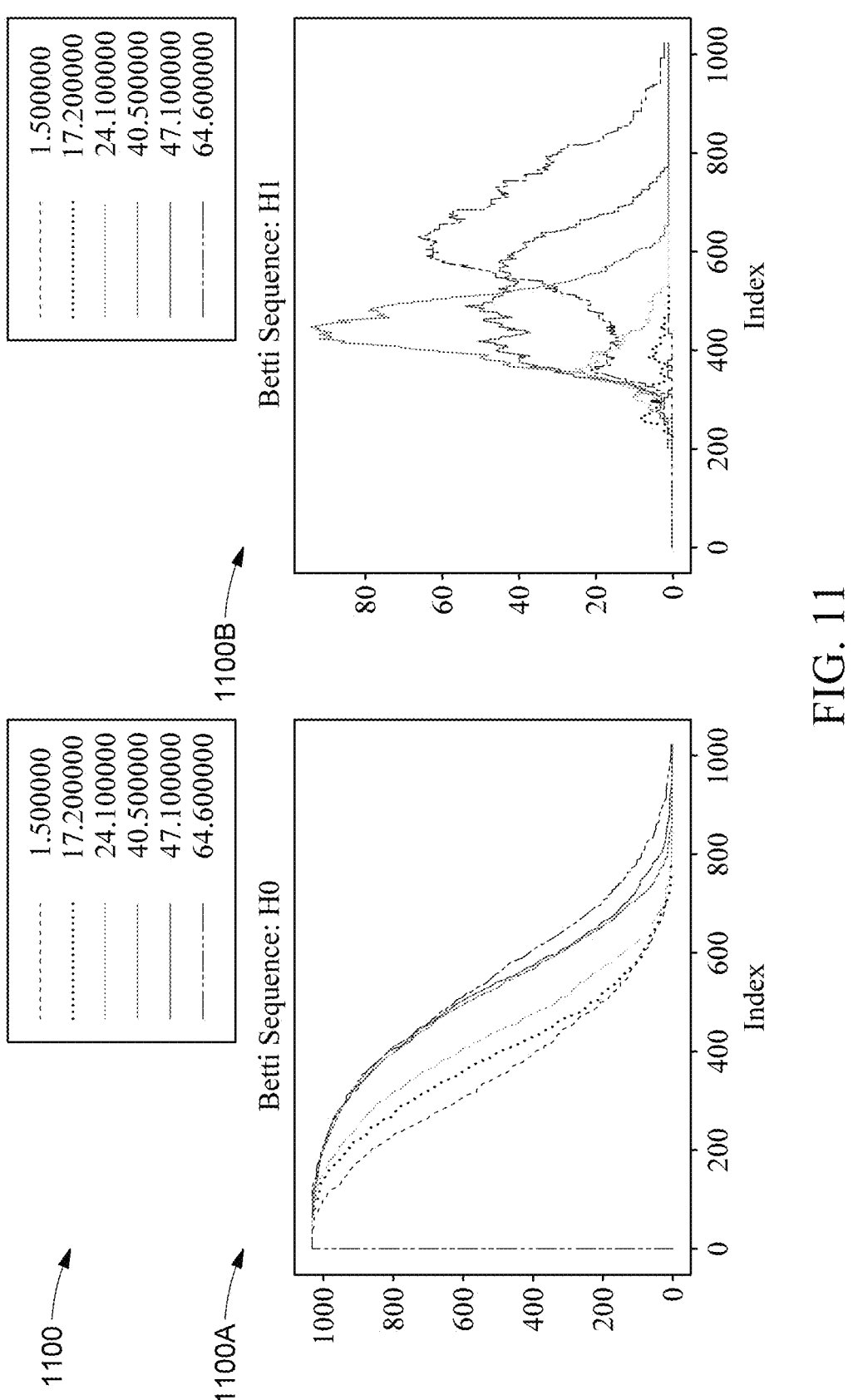
FIG. 11 shows Betti sequences or Betti curves corresponding to persistence diagrams, according to some embodiments of the present disclosure.

FIG. 11 shows Betti sequences or Betti curves corresponding to persistence diagrams, according to some embodiments of the present disclosure. The block diagram 1100 includes a Betti curve 1100A corresponding to an H0 persistence diagram and a Betti curve 1100B corresponding to an H1 persistence diagram. The H0 and H1 persistence diagrams are distinct from one another. The number of points in the H0 and H1 persistence diagrams are not fixed for different input data corresponding to the three-phase current. To feed these topological features to the machine-learning model, the H0 homology and the H1 homology are converted into H0 and H1 Betti sequences of lengths L1 and L2 respectively. In an example, for both the H0 homology and the H1 homology, the lengths L1 and L2 are fixed at 1024 whereas the filtration ranges are of [0, 0.07] and [0, 0.14] respectively.

From the H1 Betti sequences, it is observed that the number of features as a function of filtration distance changes with eccentricity levels. In addition, while the differences of H0 features cannot be inferred from the persistence diagrams, the trend in the H0 Betti sequences is observable. When the filtration radius r is 0, all 1024 data points are not connected. Therefore, all the Betti sequences start at 1024. Upon increasing the filtration radius r, more neighboring points are connected. Therefore, the number of features (i.e., the number of disconnected clusters) start to decrease. Eventually all points are connected and there is only one feature left. With higher eccentricity level, the amplitude of fault components increases, and the data points are further apart from one another due to their deviation from the large circle. Therefore, the points are connected at a later stage and these H0 features survive longer, and the area under H0 Betti curve is monotonically increasing with eccentricity level. The changes in the Betti curves are due to eccentricity.

Figure 12:
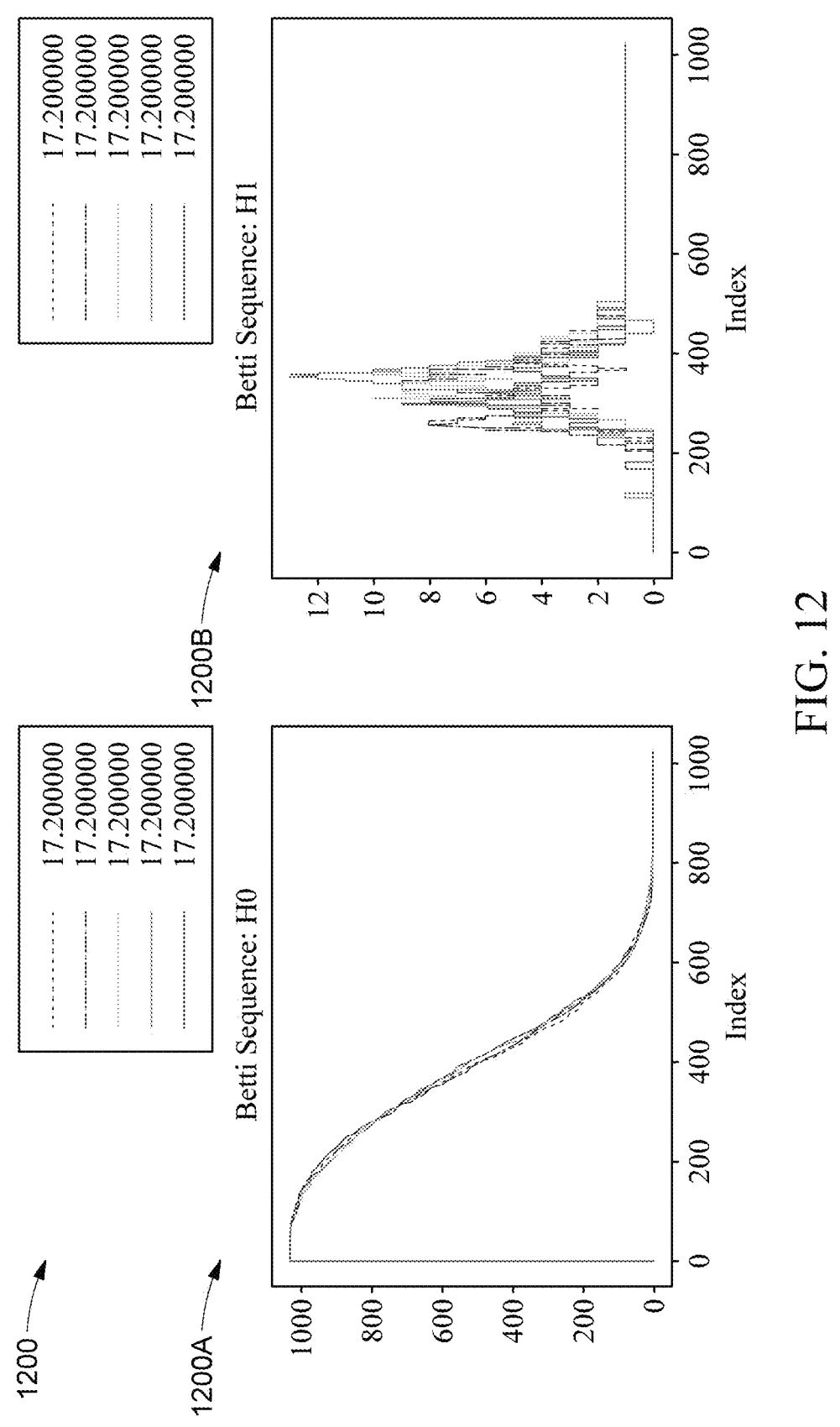
FIG. 12 shows Betti sequences or Betti curves associated with different three-phase current, according to some embodiments of the present disclosure.
Figure 12:
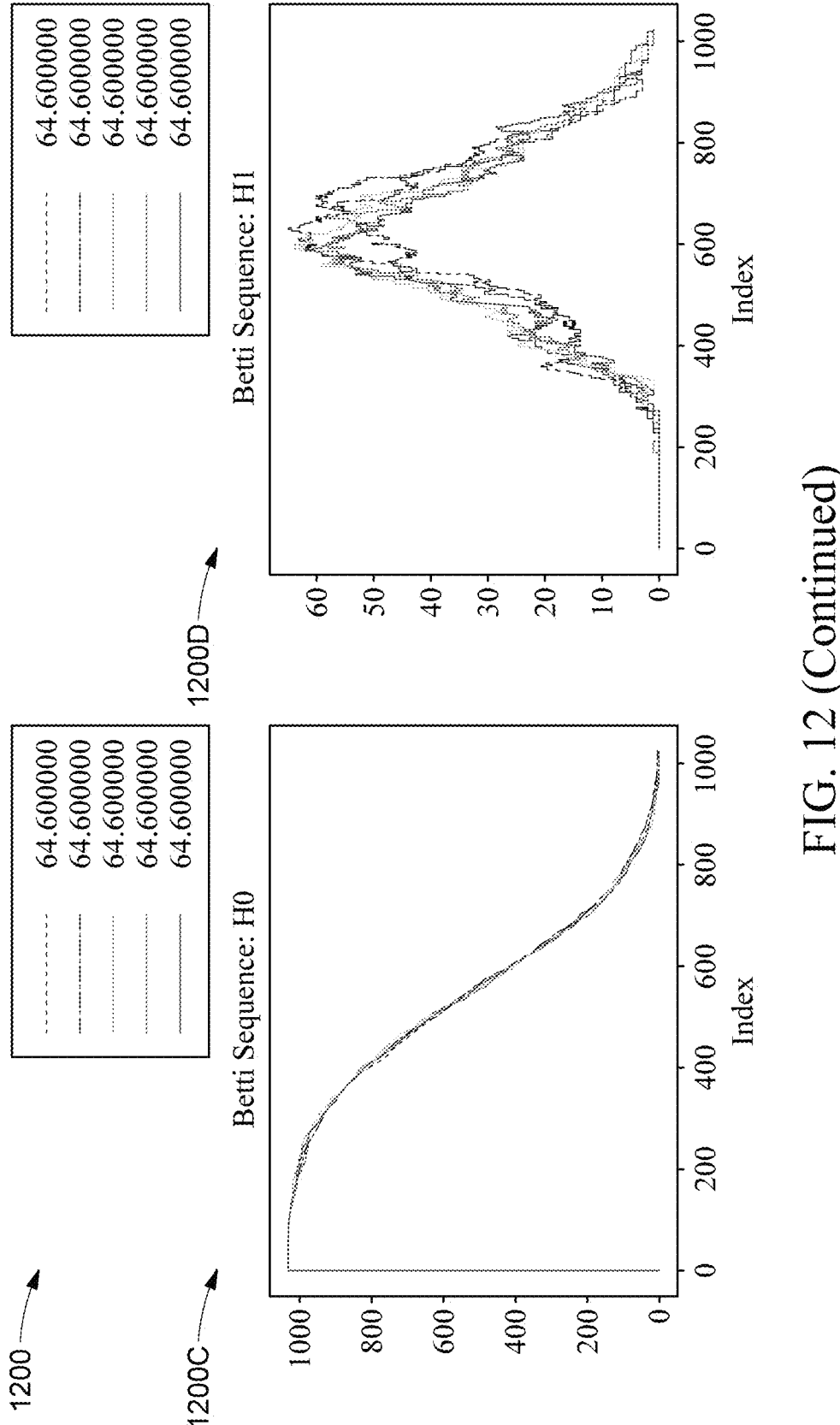

FIG. 12 shows a graphical representation 1200 of Betti sequences or Betti curves associated with different three-phase current, according to some embodiments of the present disclosure. The graphical representation 1200 includes a Betti curve 1200A corresponding to the H0 persistence diagram from five different data segments of the same eccentricity level set at 17.2%, a Betti curve 1200B corresponding to the H1 persistence diagram from five different data segments of the same eccentricity level set at 17.2%, a Betti curve 1200C corresponding to the H0 persistence diagram from five different data segments of the same eccentricity level set at 64.6%, and a Betti curve 1200D corresponding to the H1 persistence diagram from five different data segments of the same eccentricity level set at 64.6%. An important characteristic of the persistent homology is its robustness. Alternatively, robustness of the persistent homology implies that similar data structure yield similar persistent homology. The Betti curves show good consistency. The similarity of the Betti curves shown in FIG.

12 implies that the temporal fluctuations between different samples of time series data may be filtered out by the TDA process, and the fault signature may be extracted with a relatively short segment of data.

From above analysis, the proposed TDA process is effective in revealing small fault signatures embedded in a large background signal, and separating signals from different fault levels.

The calculated Betti curves are used for the data-driven approach of eccentricity fault detection, quantification, and prediction.

Figure 13:
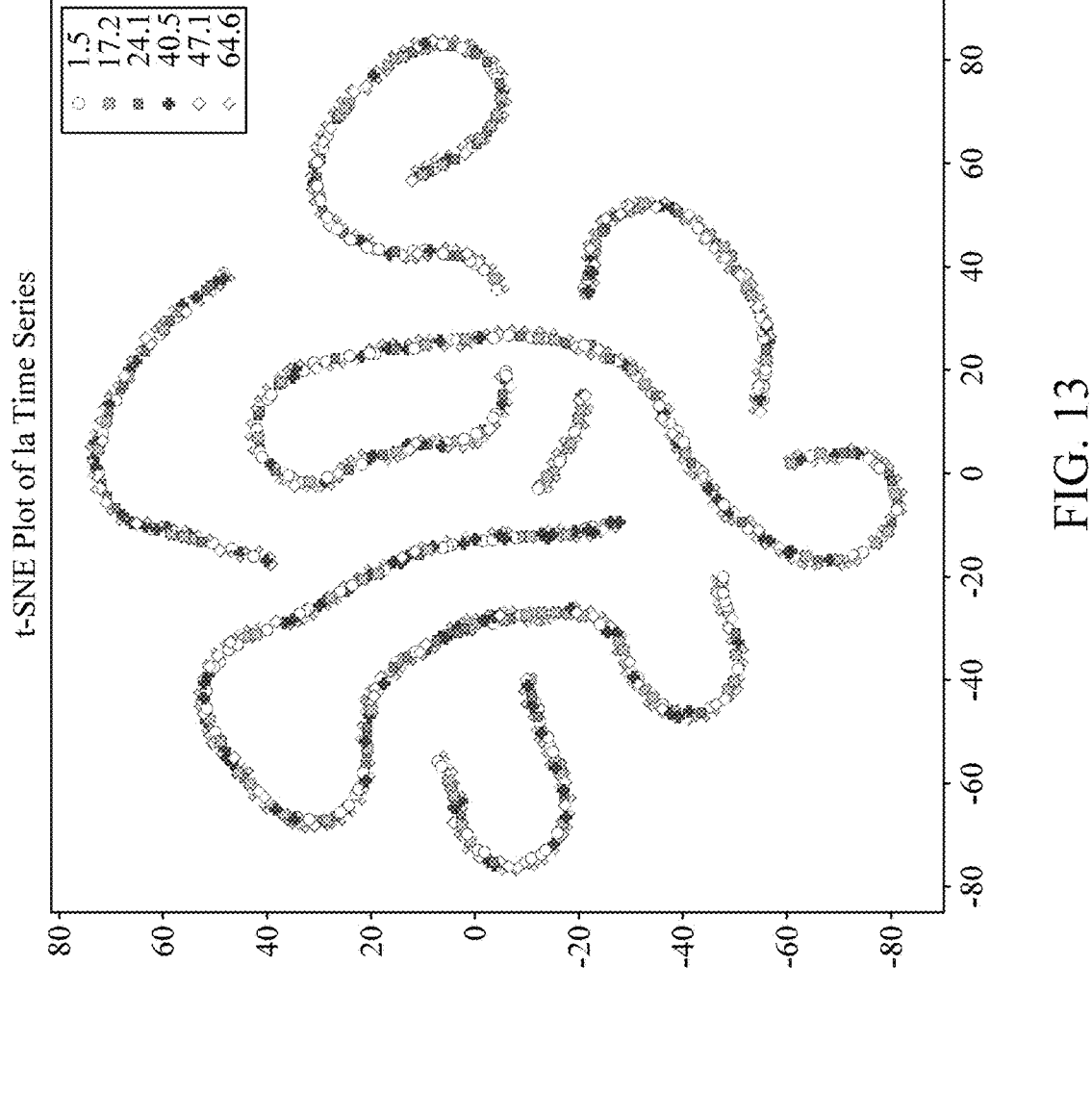
FIG. 13 shows a time-domain plot of different eccentricity levels, according to some embodiments of the present disclosure.

FIG. 13 shows a time-domain plot 1300 of different eccentricity levels, according to some embodiments of the present disclosure. In an embodiment, the eccentricity level data is measured for the motor 101 and is segmented into a total of 1170 samples, each of length 1024 data points. As an example, eccentricity level data is measured for six different eccentricity levels set at, but not limited to, 1.5%, 17.2%, 24.1%, 40.5%, 47.1%, or 64.6% respectively. As explained with reference to FIG. 5A and FIG. 5B, Betti curves are computed for the measured eccentricity level data. In an embodiment, t-distributed stochastic neighbor embedding (t-SNE) plot is used to visualize the differences of the signals of different eccentricity levels. The t-SNE plot is a commonly used tool to represent the similarities of high-dimensional data in low dimension for both the time series data of the three phase current and the computed Betti curves.

Figure 14:
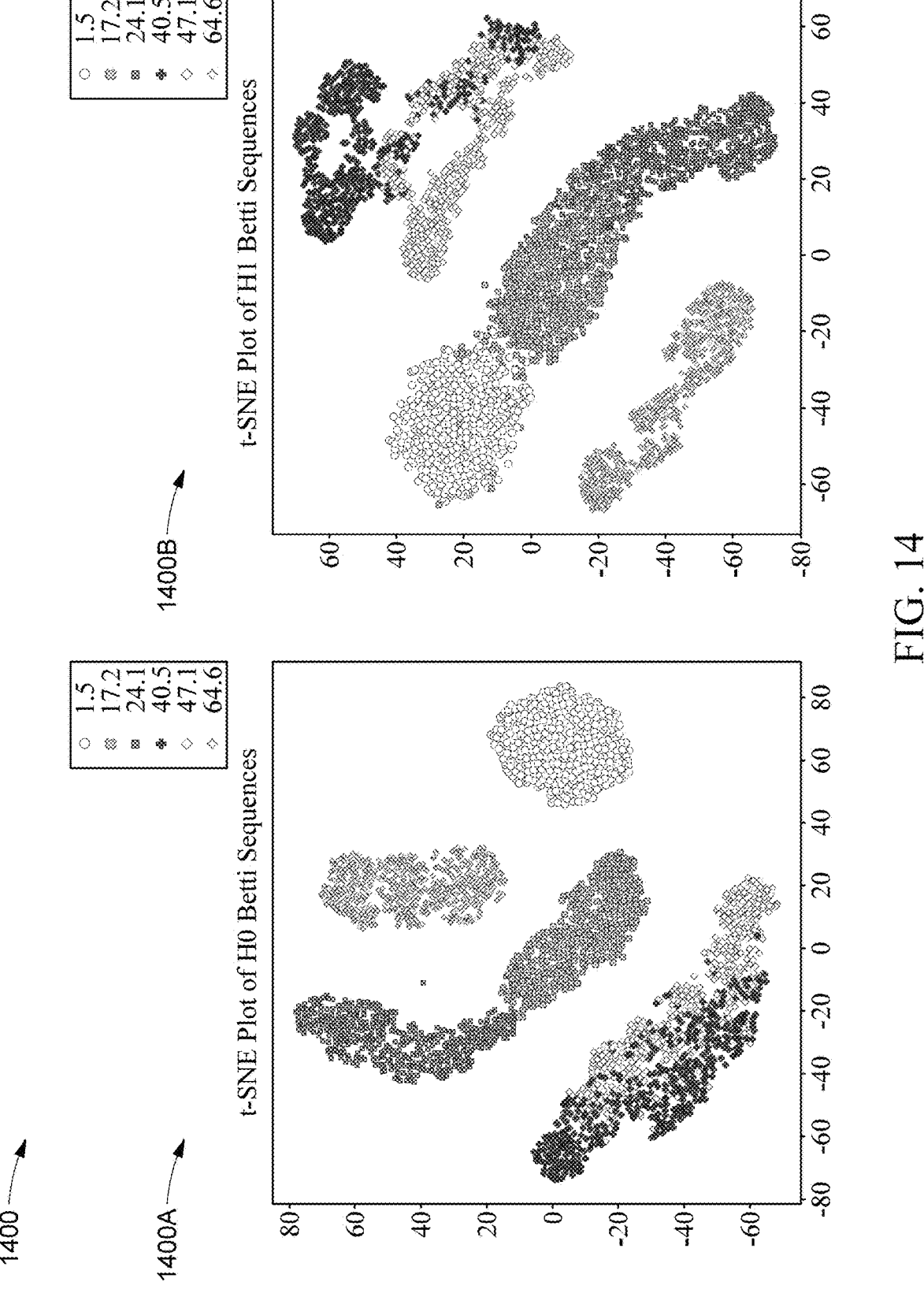
FIG. 14 illustrates a t-distributed stochastic neighbor embedding (t-SNE) plot for H0 and H1 Betti curves, according to some embodiments of the present disclosure.

FIG. 14 illustrates a t-SNE plot 1400 for H0 and H1 Betti curves, according to an embodiment of the present disclosure. The t-SNE plot 1400 includes a t-SNE plot 1400A for the H0 Betti curve and a t-SNE plot 1400B for the H1 Betti curve. As shown in FIG. 14, data from all eccentricity levels are mixed together with the time series data of the three-phase current. Data segments shown in FIG. 14 are similar since they are dominated by, for example, the dominant 60 Hz signal. For both H0 and H1 Betti sequences, however, the data samples do cluster according to their respective eccentricity level, indicating the similarity between data samples obtained from the same eccentricity level.

The dominant 60 Hz signal only corresponds to the feature value at large filtration radius in H1 Betti sequences, due to the large hole in the point clouds as shown in FIG. 6 and has little impact on the profile of the Betti curve. In this sense, the Betti curve with a threshold applied serves as a "nudge filter" that effectively removes the dominant time-domain signal and by doing so it magnifies the behavior of small signals where the fault signatures reside. The threshold may be applied without the need to know the exact frequency of the dominant signal.

Figure 15:
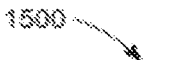
FIG. 15 shows prediction results according to some embodiments of the present disclosure.
Figure 15:
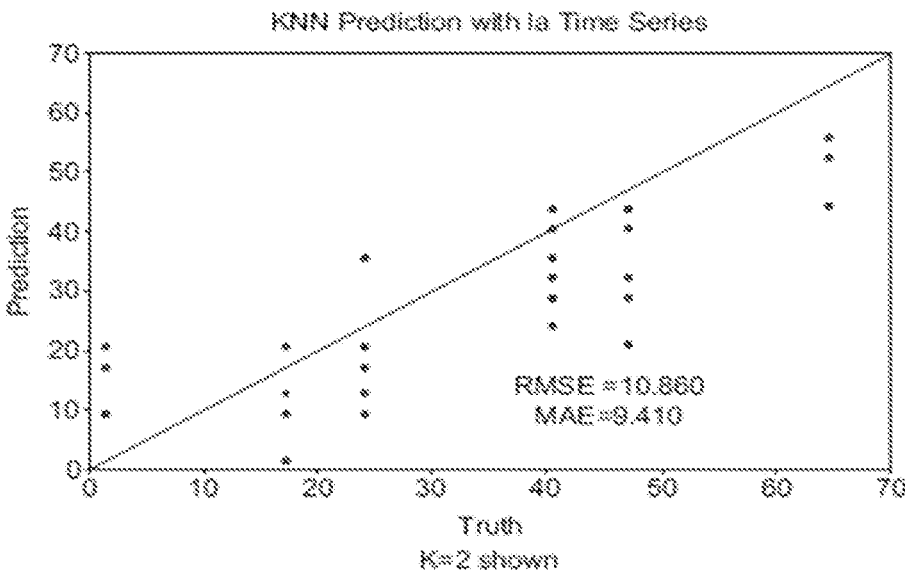

FIG. 15 shows prediction results 1500 according to some embodiments of the present disclosure. In an embodiment, the prediction results 1500 include a root mean square evaluation in the time-domain representation of phase current data. In an embodiment, there may be two application scenarios for motor eccentricity fault detection: one in the manufacturing stage, the other through the operation of a motor such as the motor 101.

In the manufacturing stage, the goal is to inspect the manufactured motors and identify the eccentricity level for quality control purpose. Since many motors of the same model will be mass produced, it makes sense to collect data covering a wide range of eccentricity levels with a test motor and develop a model to make predictions for new data measured on other motors of the same type. To mimic this scenario, the data for all eccentricity levels are shuffled and split into training and test sets with a split ratio of 0.8/0.2. Machine learning models are trained on the training dataset, and then applied to the test dataset. While many different models can be developed, the results from simple k-nearest neighbor (k-NN) regression model may be used to demonstrate the capability of the TDA. For a given new data, k-NN regression model searches for the nearest neighbors from the training dataset and predict the eccentricity level as the average level of these neighbors. As evident from results shown in FIG. 15, with time-domain phase current data, the k-NN regression model performs poorly on new data, with root-mean-squared-error (RMSE) around 10% and mean-absolute-error (MAE) around 9.4%.

Figure 16:
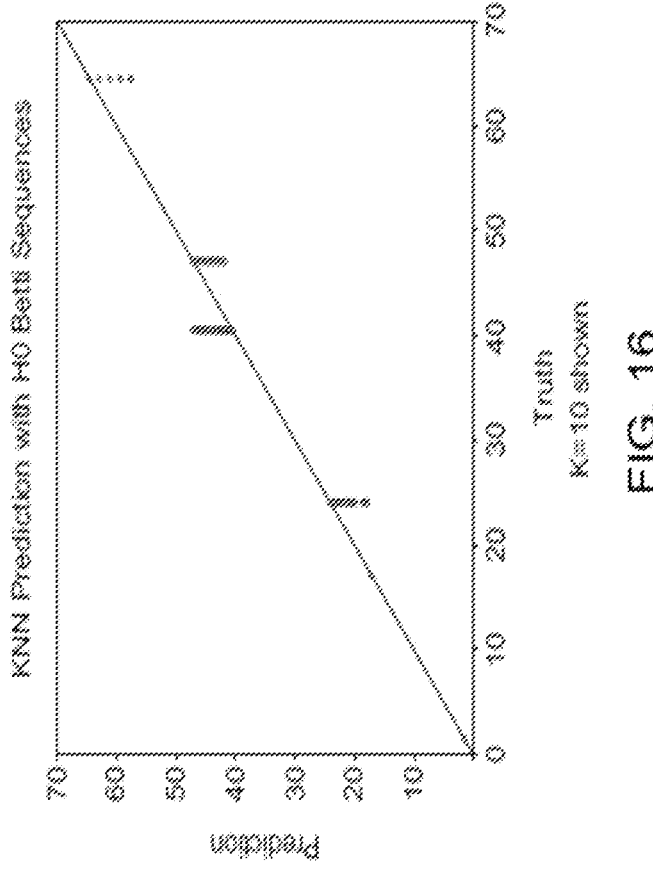
FIG. 16 shows prediction results according to some embodiments of the present disclosure.

FIG. 16 shows prediction results 1600 according to some embodiments of the present disclosure. In an embodiment, the prediction results 1600 may include a root mean square evaluation using Betti sequences. As an example, H0 Betti sequences may be given as training dataset for the k-NN regression model. For a given new data converted to H0 Betti sequences, k-NN regression model searches for the nearest neighbors from the training dataset and predict the eccentricity level as the average level of these neighbors. As evident from results shown in FIG. 16, with H0 Betti sequence, the RMSE is reduced to 1.6% and MAE is reduced to 0.7%. This result shows the effectiveness of using Betti sequences over the time-domain phase current data for interpolation purpose.

During the operating lifetime of a motor, the data for all possible eccentricity levels might not be available. Measurement data may be collected during inspections when eccentricity level is still low. A model can be built based on these earlier measurements and used to predict the eccentricity level according to later measurements where the fault is expected to become more severe over time. For this task, the experiment data from the four smaller eccentricity levels may be assigned as a training set, and the last two levels as test dataset to check the prediction capability of trained models.

Figure 17A:
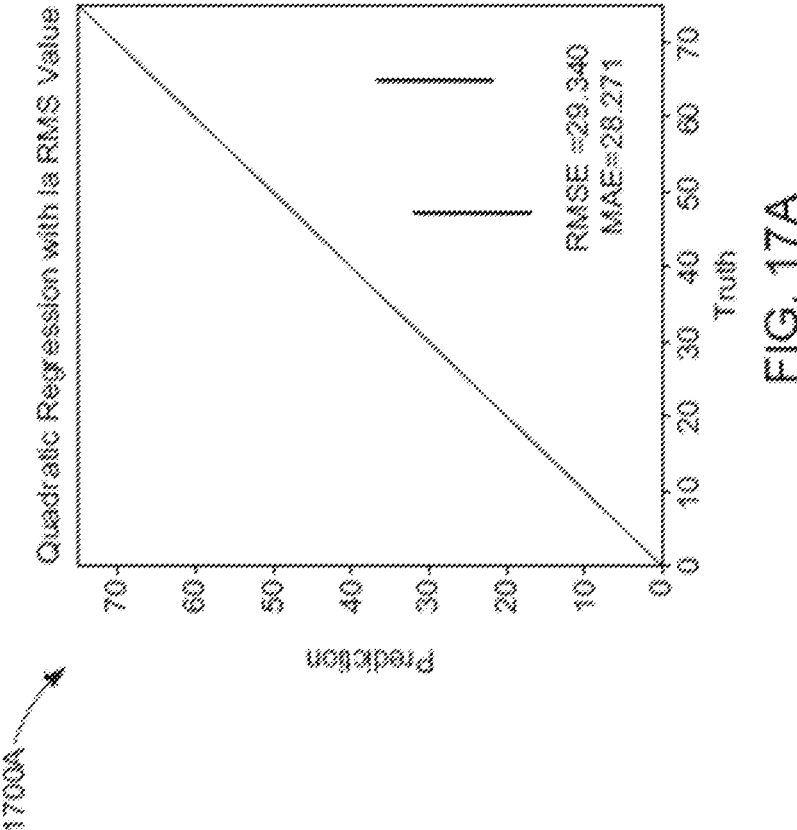
FIG. 17A shows prediction results according to some embodiments of the present disclosure.

FIG. 17A shows prediction results 1700A according to some embodiment of the present disclosure. In an embodiment, the prediction results 1700A are based on a quadratic regression model trained on the time series data of the three-phase current. As an example, the time series data of the three-phase current may be given as training dataset for the quadratic regression model, and then use it for prediction on new data. For a given new data of the three-phase current in time-domain, the quadratic regression model searches for the nearest neighbors from the training dataset and predict the eccentricity level as the average level of these neighbors. FIG. 17A shows the best prediction result using the quadratic regression model trained on the time series data of the three-phase current.

Figure 17B:
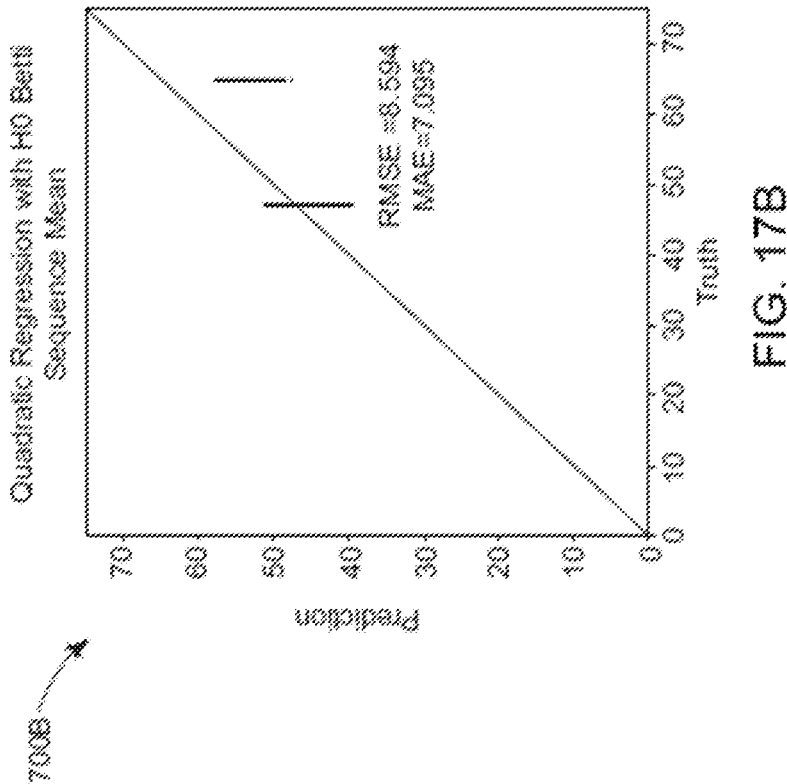
FIG. 17B shows prediction results according to some embodiments of the present disclosure.

FIG. 17B shows prediction results 1700B according to an embodiment of the present disclosure. In an embodiment, the prediction results 1700B are based on a regression model trained on H0 Betti sequences. As an example, the H0 Betti sequences for the time series data of the three-phase current may be given as training dataset for the quadratic regression model. For a given new data of the H0 Betti sequences, the quadratic regression model searches for the nearest neighbors from the training dataset and predict the eccentricity level as the average level of these neighbors. FIG. 17B shows the best prediction result using the quadratic regression model trained on the H0 Betti sequences.

Figure 17C:
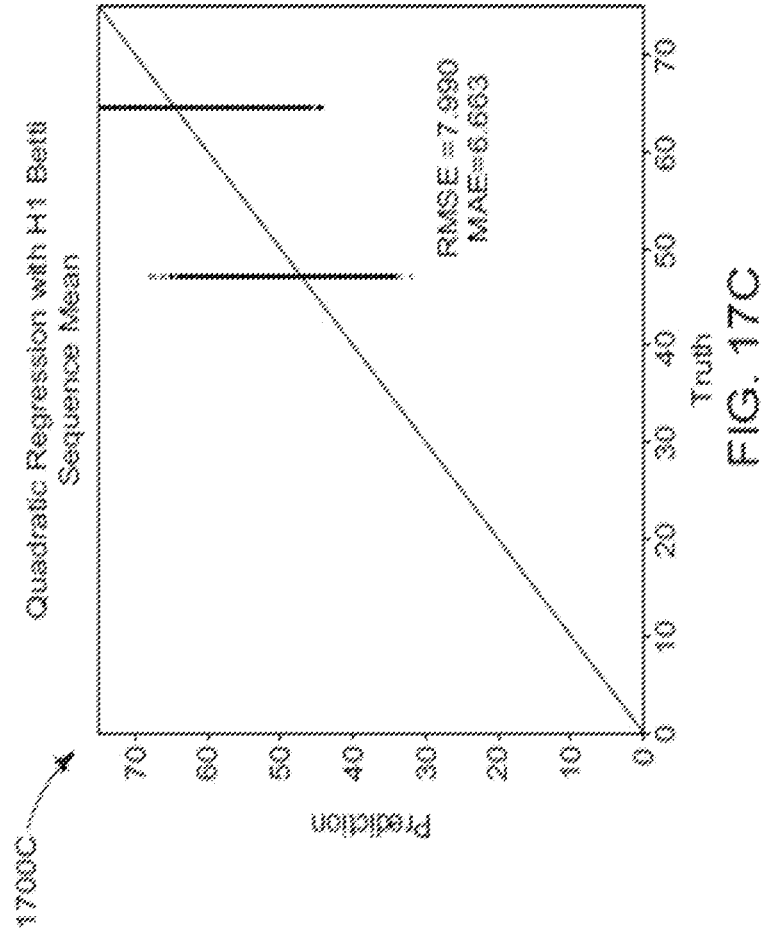
FIG. 17C shows prediction results according to some embodiments of the present disclosure.

FIG. 17C shows prediction results 1700C according to some embodiments of the present disclosure. In an embodiment, the prediction results are based on a regression model trained on H1 Betti sequences. As an example, the H1 Betti sequences for the time series data of the three-phase current may be given as training dataset for the quadratic regression model. For a given new data of the H1 Betti sequences, the quadratic regression model searches for the nearest neighbors from the training dataset and predict the eccentricity level as the average level of these neighbors. FIG. 17C shows the best prediction result using the quadratic regression model trained on the H1 Betti sequences.

Figure 17D:
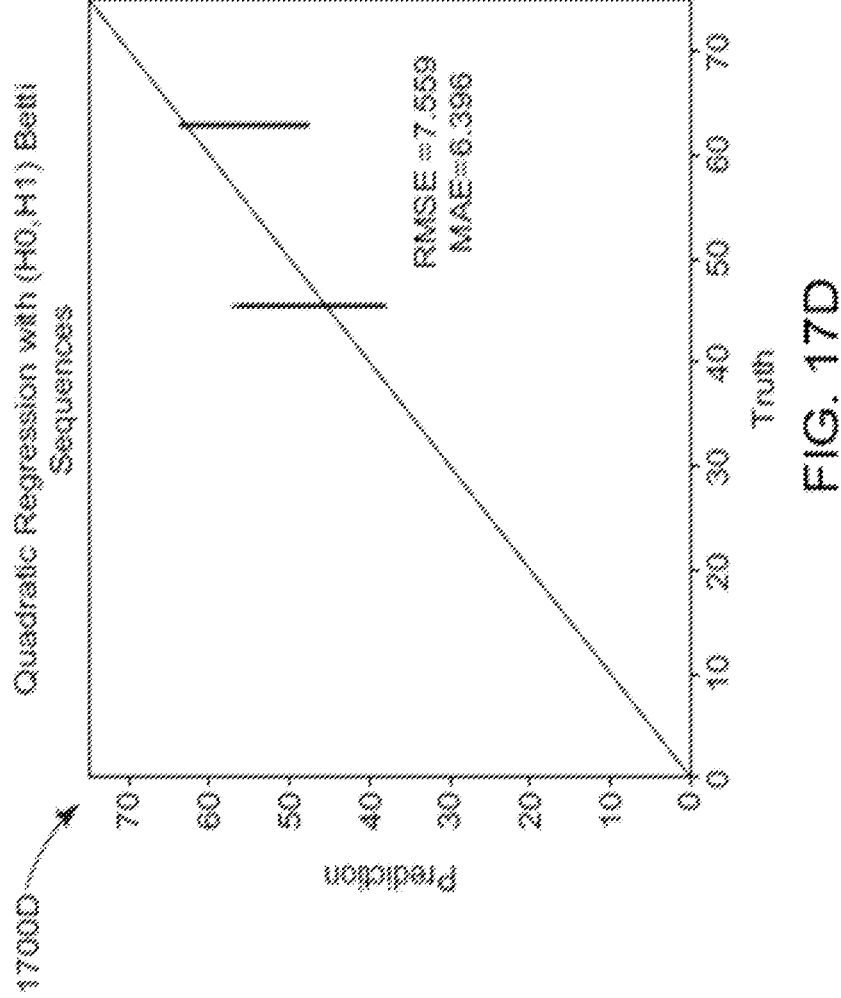
FIG. 17D shows prediction results according to some embodiments of the present disclosure.

FIG. 17D shows prediction results according to some embodiments of the present disclosure. In an embodiment, the prediction results are based on a regression model trained on H0 and H1 Betti sequences. As an example, both the H0 and H1 Betti sequences for the time series data of the three-phase current may be given as training dataset for the quadratic regression model. For a given new data of the H0 and H1 Betti sequences, the quadratic regression model searches for the nearest neighbors from the training dataset and predict the eccentricity level as the average level of these neighbors. FIG. 17D shows the best prediction result using the quadratic regression model trained on the H0 and H1 Betti sequences.

The high RMSE and MAE (both close to 30%) indicates the failure of effective prediction. For Betti sequences, we extract the mean values for both H0 and H1 sequences, and use them to fit a quadratic regression model, which shows a much improved prediction accuracy, with RMSE and MAE reduced to 8.6% and 7.1% respectively when using both the H0 and H1 Betti sequences.

Other machine learning models such as supporting vector regression (SVR) models, Gaussian process regression (GPR) models, artificial neural networks (ANNs), and convolutional neural networks (CNNS) may also be used instead of the quadratic regression model. However, these models tend to overfit on the training dataset and perform worse for extrapolation on new data.

Compared with the MCSA, which requires involved domain knowledge and a physical model to identify the fault signatures, no physical model for the fault is required in the TDA process or, for example, the process described with reference to FIGS. 5A and 5B. With TDA processed inputs, data cluster properly according to the fault level. Thus, suggesting the possibility of unsupervised learning for the fault classification. In addition, improved prediction results can be achieved with only a short segment of time-domain data. In all the tests, the length of time series data is 1024 points, or about 0.1 s. In comparison, traditional spectrum analysis methods with MCSA often require several seconds or longer data in order to stably identify the fault components in addition to the domain knowledge required to identify the fault signatures. These advantages make the proposed TDA method promising to be applied to a broad range of fault detection tasks.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A fault detector for detecting an eccentricity of a motor including a stator and a rotor separated by an air gap, the fault detector comprising: a processor; and a memory having instructions stored thereon that, when executed by the processor, cause the fault detector to:

collect, over a communication channel including one or a combination of a wired and wireless communication link, an electrical feedback signal of an operation of the motor including time series data of three-phase current measured during a period of the operation of a motor;

map data points of the time series data into a three-dimensional space of the three-phase current to form a three-phase point cloud;

extract a topological representation of topological features of the three-phase point cloud using topological data analysis (TDA);

classify an eccentricity of the motor based on the extracted topological representation; and transmit, over the communication channel, a control command selected based on the classified eccentricity of the motor to a system configured to operate the motor, the control command causing the system to take corrective action relating to the eccentricity of the motor.

2. The fault detector of claim 1, wherein the classified eccentricity includes a type of the eccentricity and a level of severity of the eccentricity.

3. The fault detector of claim 1, wherein to classify the eccentricity, the processor executes a model previously trained in a supervised manner to classify different topological representations labeled with a type of the eccentricity, a level of severity of the eccentricity, or both.

4. The fault detector of claim 3, wherein the model is a regression model.

5. The fault detector of claim 4, wherein the regression model includes extrapolation of labeled levels of severity of the eccentricity used for the training.

6. The fault detector of claim 3, wherein the model is a neural network.

7. The fault detector of claim 1, wherein to extract the topological features using the TDA, the processor is configured to:

perform persistent homology examining the three-phase point cloud at different scales; and determine the topological representation as a representation of the persistent homology.

8. The fault detector of claim 7, wherein the representation of the persistent homology includes one or a combination of a persistence barcode and a persistence diagram.

9. The fault detector of claim 7, wherein the representation of the persistent homology is obtained through filtration by computing the persistent homology with different threshold values and tracking lifespans of different topological features at corresponding threshold values.

10. The fault detector of claim 9, wherein the topological features tracked by the persistent homology include Ho features corresponding to a number of clusters formed by connected components in the three-phase point cloud and $H_1$ features corresponding to holes formed by spaces enclosed by surrounding connected components in the three-phase point cloud.

11. The fault detector of claim 1, wherein the processor is further configured to execute the instructions to cause the fault detector to convert the topological representation of the topological features into a Betti sequence or a Betti curve.

12. The fault detector of claim 11, wherein the processor is further configured to execute the instructions to cause the fault detector to classify the eccentricity of the motor based on the Betti sequence or the Betti curve.

13. The fault detector of claim 1, wherein the TDA filter out a dominant shape of the three-phase point cloud.

14. A method for detecting an eccentricity fault in a motor including a stator and a rotor separated by an air gap, the method comprising:

collecting, over a communication channel including one or a combination of a wired and wireless communication link, an electrical feedback signal of an operation of the motor including time series data of three-phase current measured during a period of the operation of the motor;

mapping data points of the time series data into a three-dimensional space of the three- phase current to form a three-phase point cloud;

extracting a topological representation of topological features of the three-phase point cloud using topological data analysis (TDA);

classifying an eccentricity of the motor based on the extracted topological representation; and transmitting, over the communication channel, a control command selected based on the classified eccentricity of the motor to a system configured to operate the motor, the control command causing the system to take corrective action relating to the eccentricity of the motor.

15. The method of claim 14, wherein the classified eccentricity includes a type of the eccentricity and a level of severity of the eccentricity.

16. The method of claim 14, further comprising executing a model previously trained in a supervised manner to classify different topological representations labeled with a type of the eccentricity, a level of severity of the eccentricity, or both.

17. The method of claim 16, wherein the model is a regression model.

18. The method of claim 17, wherein the regression model includes extrapolation of labeled levels of severity of the eccentricity used for the training.

19. The method of claim 16, wherein the model is a neural network.

20. The method of claim 14, wherein extracting the topological features using the TDA further comprises:

performing persistent homology that includes examining the three-phase point cloud at different scales; and determining the topological representation as a representation of the persistent homology.

* * * * *